United States Patent
Leidel et al.

(10) Patent No.: US 10,754,787 B2
(45) Date of Patent: *Aug. 25, 2020

(54) VIRTUAL ADDRESS TABLE

(71) Applicant: Micron Technology, Inc., Boise, ID (US)

(72) Inventors: John D. Leidel, McKinney, TX (US); Kyle B. Wheeler, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,154

(22) Filed: Apr. 8, 2019

(65) Prior Publication Data

US 2019/0236023 A1 Aug. 1, 2019

Related U.S. Application Data

(63) Continuation of application No. 15/911,786, filed on Mar. 5, 2018, now Pat. No. 10,255,193, which is a
(Continued)

(51) Int. Cl.
*G06F 12/00* (2006.01)
*G06F 13/00* (2006.01)
(Continued)

(52) U.S. Cl.
CPC .......... *G06F 12/1009* (2013.01); *G06F 8/441* (2013.01); *G06F 9/445* (2013.01);
(Continued)

(58) Field of Classification Search
CPC ....... G06F 12/1009; G06F 12/02; G06F 12/10
(Continued)

(56) References Cited

U.S. PATENT DOCUMENTS

| 4,380,046 A | 4/1983 | Fung |
| 4,435,792 A | 3/1984 | Bechtolsheim |

(Continued)

FOREIGN PATENT DOCUMENTS

| CN | 102141905 | 8/2011 |
| EP | 0214718 | 3/1987 |
| EP | 2026209 | 2/2009 |
| JP | H0831168 | 2/1996 |

(Continued)

OTHER PUBLICATIONS

Boyd et al., "On the General Applicability of Instruction-Set Randomization", Jul.-Sep. 2010, (14 pgs.), vol. 7, Issue 3, IEEE Transactions on Dependable and Secure Computing.
(Continued)

*Primary Examiner* — Edward J Dudek, Jr.
*Assistant Examiner* — Sidney Li
(74) *Attorney, Agent, or Firm* — Brooks, Cameron & Huebsch, PLLC

(57) ABSTRACT

The present disclosure includes apparatuses and methods related to virtual address tables. An example method comprises generating an object file that comprises: an instruction comprising a number of arguments; and an address table comprising a number of indexed address elements. Each one of the number of indexed address elements can correspond to a virtual address of a respective one of the number of arguments, wherein the address table can serves as a target for the number of arguments. The method can include storing the object file in a memory.

20 Claims, 8 Drawing Sheets

Related U.S. Application Data continuation of application No. 14/713,121, filed on May 15, 2015, now Pat. No. 9,910,787.

(60) Provisional application No. 62/007,985, filed on Jun. 5, 2014.

(51) Int. Cl.
*G06F 13/28* (2006.01)
*G06F 12/1009* (2016.01)
*G06F 8/41* (2018.01)
*G06F 9/445* (2018.01)
*G06F 12/10* (2016.01)
*G06F 12/02* (2006.01)

(52) U.S. Cl.
CPC .............. *G06F 12/02* (2013.01); *G06F 12/10* (2013.01); *G06F 2212/657* (2013.01)

(58) Field of Classification Search
USPC ........................................................ 711/207
See application file for complete search history.

(56) References Cited

U.S. PATENT DOCUMENTS

| | | |
|---|---|---|
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |

(56) References Cited

U.S. PATENT DOCUMENTS

| | | |
|---|---|---|
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 2001/0007112 A1 | 7/2001 | Porterfield |
| 2001/0008492 A1 | 7/2001 | Higashiho |
| 2001/0010057 A1 | 7/2001 | Yamada |
| 2001/0013093 A1 | 8/2001 | Banno et al. |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2002/0138748 A1 | 9/2002 | Hung |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0078185 A1 | 4/2004 | Briggs et al. |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0006137 A1 | 1/2007 | Savagaonkar et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0022265 A1 | 1/2008 | Morris |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0011371 A1 | 1/2012 | Lee et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0344934 A1 | 11/2014 | Jorgensen |
| 2015/0134713 A1 | 5/2015 | Wheeler |
| 2015/0324290 A1 | 11/2015 | Leidel |
| 2015/0325272 A1 | 11/2015 | Murphy |

FOREIGN PATENT DOCUMENTS

| | | |
|---|---|---|
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Stojmenovic, "Multiplicative Circulant Networks Topological Properties and Communication Algorithms", (25 pgs.), Discrete Applied Mathematics 77 (1997) 281-305.

(56) References Cited

OTHER PUBLICATIONS

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

Debnath, Biplob, Bloomflash: Bloom Filter on Flash-Based Storage, 2011 31st Annual Conference on Distributed Computing Systems, Jun. 20-24, 2011, 10 pgs.

Pagiamtzis, Kostas, "Content-Addressable Memory Introduction", Jun. 25, 2007, (6 pgs.), retrieved from: http://www.pagiamtzis.com/cam/camintro.

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

International Search Report and Written Opinion for PCT Application No. PCT/US2013/043702, dated Sep. 26, 2013, (11 pgs.).

Elliot, et al., "Computational RAM: Implementing Processors in Memory", Jan.-Mar. 1999, (10 pgs.), vol. 16, Issue 1, IEEE Design and Test of Computers Magazine.

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceedings of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

European Search Report and Written Opinion for related EP Application No. 15803929.7, dated Jan. 3, 2018, 7 pages.

Notice of Rejection for related Korea Patent Application No. 10-2017-7000379, dated Nov. 30, 2018, 7 pages.

Office Action for related China Patent Application No. 201580030171.1, dated Nov. 16, 2018, 15 pages.

US 10,754,787 B2

VIRTUAL ADDRESS TABLE

PRIORITY INFORMATION

This application is a Continuation of U.S. application Ser. No. 15/911,786, filed Mar. 5, 2018, which issues as U.S. Pat. No. 10,255,193 on Apr. 9, 2019, which is a Continuation of U.S. application Ser. No. 14/713,121, filed May 15, 2015, which issued as U.S. Pat. No. 9,910,787 on Mar. 6, 2018, which claims the benefit of U.S. Provisional Application No. 62/007,985, filed Jun. 5, 2014, the contents of which are included herein by reference.

TECHNICAL FIELD

The present disclosure relates generally to semiconductor memory and methods, and more particularly, to apparatuses and methods related to virtual address tables.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Electronic systems often include a number of processing resources (e.g., one or more processors), which may, generate, retrieve, and execute applications (e.g., executable files such as software programs) to perform various tasks, for instance. An application can be generated, for example, by transforming (e.g., via a compiler) source code written in a particular programming language (e.g., a high level language) into an object file (e.g., a file comprising relocatable object code written in a low level machine language and/or assembly language). In various instances, a linker may be used to combine a number of object files, which may not be directly executable by the processing resources, into an executable file. The executable file can be stored in memory and retrieved therefrom by the processor for execution at runtime. The executable file can be relocatable in that its actual physical location in memory can change each time it is executed. Virtual addressing can be used (e.g., by an operating system) to manage translation of virtual addresses corresponding to an executable file to the appropriate physical addresses in memory.

A processor can comprise a number of functional units such as arithmetic logic unit (ALU) circuitry, floating point unit ( ) circuitry, and/or a combinatorial logic block, for example, which can comprise a number of registers and can be used to execute instructions by performing logical operations such as AND, OR, NOT, NAND, NOR, and XOR logical operations on operands. For example, the number of functional units, which may be referred to as functional unit circuitry, may be used to perform arithmetic operations such as addition, subtraction, multiplication, and/or division on operands. In many instances, the processing resources may be external to a memory device comprising a memory array in which the instructions to be executed (e.g., the executable file) are stored. The instructions to be executed can be accessed (e.g., retrieved from the memory array) via a bus between the processing resources and the memory device, for example.

Since the locations of the functional units (e.g., registers) of the processor are known (e.g., fixed) at compile time, in many instances, an object file generated by a compiler includes instructions whose arguments are indices to particular registers of a processor. Therefore, at runtime (e.g., when an executable file comprising the object file is loaded to a particular physical location in memory and executed), the arguments (e.g., operands) of the target instructions within the executable file can be provided to the appropriate registers based on the known virtual addresses of the arguments.

DETAILED DESCRIPTION

Figure 1:
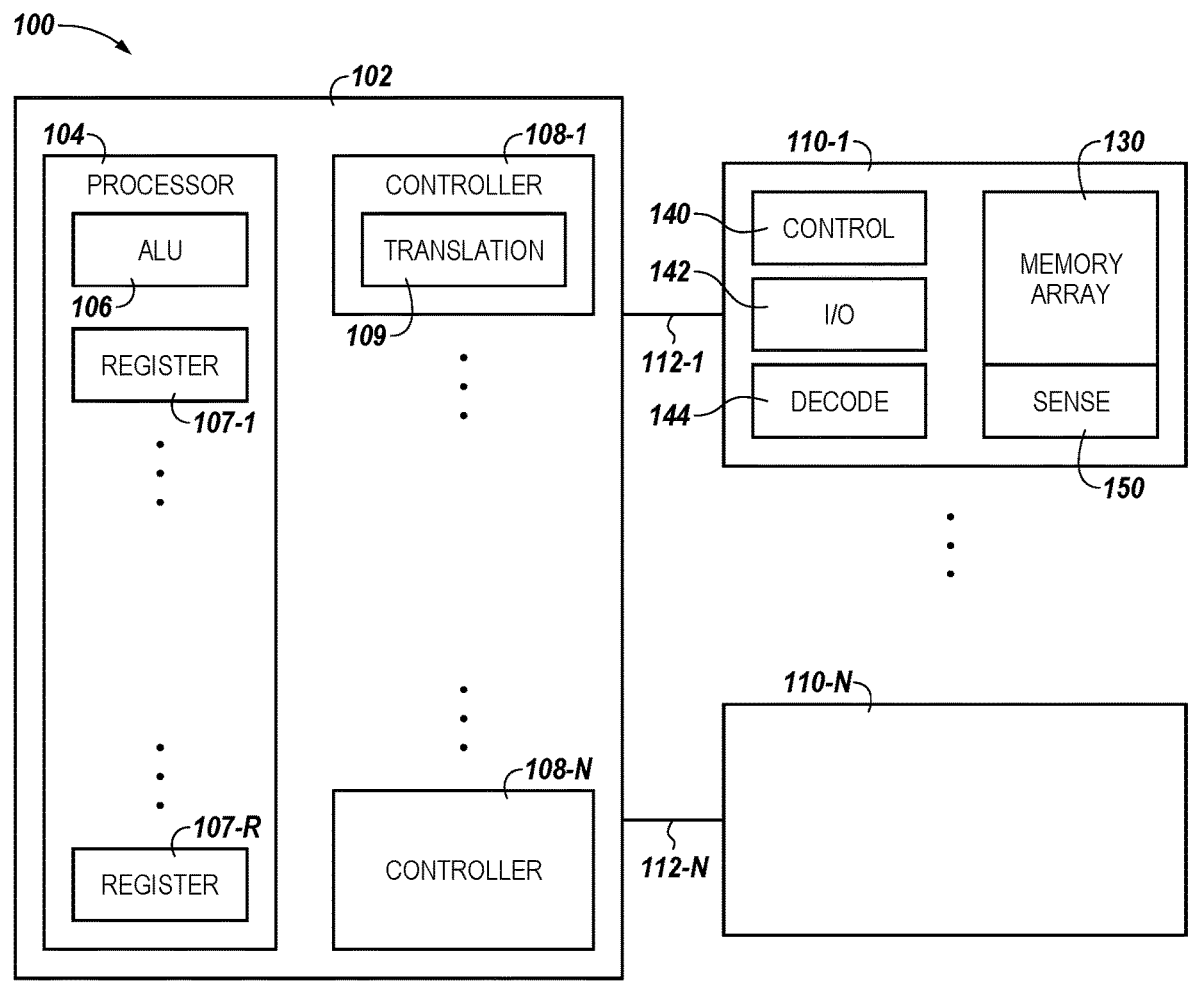
FIG. 1 is a block diagram of an apparatus in the form of a computing system including a memory device in accordance with a number of embodiments of the present disclosure.

The present disclosure includes apparatuses and methods related to virtual address tables. An example method comprises generating an object file that comprises: an instruction comprising a number of arguments; and an address table comprising a number of indexed address elements. Each one of the number of indexed address elements can correspond to a virtual address of a respective one of the number of arguments, wherein the address table can serves as a target for the number of arguments. The method can include storing the object file in a memory.

A number of embodiments of the present disclosure relate to a machine-level instruction set architecture (ISA) that can be referred to as a PIMD (performed in memory device) ISA that accepts physical row and/or column indices as instruction arguments. A PIMD instruction can refer to an instruction whose corresponding operation(s) are performed in a number of memory arrays in-situ. As an example, such PIMD instructions can be performed without transferring the corresponding operands from the array(s) to external registers (e.g., registers of an external processor) and/or to other functional unit circuitry not formed on pitch with the memory cells of the array. As described further below, a memory array can comprise an array of memory cells and sensing circuitry coupled thereto and which is formed on pitch with the memory cells. The sensing circuitry can comprise, for example, a number of sense amplifiers corresponding to respective columns of memory cells (e.g., cells coupled to a sense line or pair of complementary sense lines) and compute components, and can be operated (e.g., via control signals) to execute PIMD instructions. In a number of embodiments, a memory device can comprise a memory array configured to execute PIMD instructions as well as non-PIMD instructions (e.g., instructions executed to perform operations such as arithmetic operations by transferring the operands from the array to registers of an external processor and/or other functional unit circuitry external to the array).

When a compiler generates object files for applications to be executed by traditional processors, the arguments to the object file instructions are often register indices corresponding to particular processor registers to which operands are provided in association with executing the instruction (e.g., an arithmetic operation, compare operation, etc.). However, as described further herein, since PIMD instructions in accordance with a number of embodiments of the present disclosure are executed without transferring the operands to external registers, the compiler technique of including processor indices as arguments to the object file instructions is inadequate for PIMD instructions. Since the particular physical row and column address corresponding to PIMD instruction arguments are not known at compile time, a number of embodiments of the present disclosure implement a PIMD address table (PAT) that can provide a virtual address abstraction layer to provide a compiler with access to machine-level PIMD instructions. As described further below, an object file can be generated (e.g., by a compiler) that comprises a number of PIMD instructions whose arguments (e.g., operands) are indices of a respective PAT. That is, a PAT is generated for each respective PIMD instruction. Each PAT is an indexed table of address elements with the size of the table (e.g., the quantity of address elements) being equal to the number of arguments of the PIMD instruction to which the respective PAT corresponds.

At runtime, the indexed address elements of the PATs can be populated with the appropriate virtual addresses of the respective PIMD instruction arguments. The virtual addresses can be translated to their physical addresses and then to their corresponding row and column indices for execution on a particular PIMD device.

A number of embodiments of the present disclosure provide benefits such as a way for applications and/or operating systems that use relocatable object files to access machine-level instructions corresponding to operations to be performed on operands stored in an array without transferring the operands to external functional units such as external processor registers. Providing a PAT in accordance with a number of embodiments of the present disclosure can prevent a need for a compiler to manually allocate every bit in virtual memory for every application stored in physical memory in order to provide access to PIMD instruction arguments (e.g., operands) at runtime. In the absence of a PAT, applications targeting PIMD instructions, may be bound to particular physical addresses and/or row/column indices of a memory device (e.g., a DRAM device), since the particular row/column indices corresponding the arguments (e.g., operands) are unknown at compile-time (e.g., for relocatable object files whose physical location in memory can change each time a corresponding application is executed). Providing a PAT in accordance with a number of embodiments described herein, can provide an ability to translate virtual addresses to abstract indices (e.g., table indices) at compile time rather than having to translate the virtual addresses to physical addresses at compile time.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N," and "R," particularly with respect to reference numerals in the drawings, indicates that a number of the particular feature so designated can be included. As used herein, "a number of" a particular thing can refer to one or more of such things (e.g., a number of memory arrays can refer to one or more memory arrays).

The figures herein follow a numbering convention in which the first digit or digits correspond to the drawing figure number and the remaining digits identify an element or component in the drawing. Similar elements or components between different figures may be identified by the use of similar digits. For example, 260 may reference element "60" in FIG. 2, and a similar element may be referenced as 360 in FIG. 3. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a block diagram of an apparatus in the form of a computing system 100 including a number of memory devices 110-1, . . . , 110-N in accordance with a number of embodiments of the present disclosure. System 100 includes a host 102 coupled to memory devices 110-1, . . . , 110-N (referred to generally as memory devices 110), which each include a memory array 130. As used herein, a host 102, a memory device 110, and/or a memory array 130 might also be separately considered an "apparatus."

Host 102 can be a host system such as a personal laptop computer, a desktop computer, a digital camera, a smart phone, or a memory card reader, among various other types of hosts. Host 102 can include a system motherboard and/or backplane and can include a number of processing resources (e.g., one or more processors, microprocessors, and/or some other type of controlling circuitry). In the example shown in FIG. 1, the host 102 comprises a processor 104 (e.g., "core" processor) and a number of channel controllers 108-1, . . . , 108-N (referred to generally as channel controllers 108). The channel controllers 108-1 to 108-N are coupled to memory devices 110 of respective channels 112-1, . . . , 112-N (referred to generally as channels 112). Embodiments are not limited to the configuration shown in FIG. 1. For example, each channel 112 can comprise multiple memory devices 110 corresponding thereto, the host can comprise multiple processors 104, and a memory device 110 can comprise multiple memory arrays 130.

The system 100 can include separate integrated circuits or multiple components can be on a same integrated circuit (e.g., die). For instance, in the example shown in FIG. 1, the host 102 comprises the processor 104 and channel controllers 108 on a same die (e.g., as a "system on a chip"), and the memory devices 110 are on a separate die. However, in a number of embodiments, the processor 104 and channel controllers 108 may be separate integrated circuits, or one or more of the memory devices 110 can be located on a same integrated circuit as the processor 104 and/or the channel controllers 108.

The processor 104 comprises an arithmetic logic unit (ALU) 186 and a number of registers 107-1, . . . , 107-R (referred to generally as registers 107). The ALU 186 can perform arithmetic (e.g., addition, subtraction, multiplication, division) operations and/or logical operations (e.g., AND, OR, NOT, etc.) on operands provided thereto. The registers 107 can include an address register, data register, program counter, and accumulator, among other registers associated with executing instructions to perform various operations. The processor 104 can be responsible for executing an operating system (OS) and/or a compiler, as well as initiating user applications. The processor 104 can also be responsible for performing runtime functions such as populating PATs in association with executing object files in accordance with a number of embodiments described herein.

The memory devices 110 include a memory array 130 that comprises sensing circuitry 150 and can receive control signals (e.g., from a control component 140) to perform various operations in association with executing PIMD instructions as described herein. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines) or pairs of complementary sense lines. Although a single array 130 is shown in FIG. 1, embodiments are not so limited. For instance, memory device 110 may include a number of arrays 130 (e.g., a number of banks and/or sub-arrays of DRAM cells).

The memory devices 110 include address circuitry (not shown) to latch address signals provided thereto (e.g., via a respective channel 112 through input/output (I/O) circuitry 142). Address signals are received and decoded by decode circuitry 144 (e.g., a row decoder and a column decoder) to access the memory array 130. Data can be read from memory array 130 by sensing voltage and/or current changes on the sense lines using sensing circuitry 150. The sensing circuitry 150 can read and latch a page (e.g., row) of data from the memory array 130. The IO circuitry 142 can be used for bi-directional data communication with host 102 over the channels 112. The memory devices 110 can also include write circuitry (not shown) used to write data to the memory array 130.

The control component 140 decodes signals provided to the memory device (e.g., 110-1) from the host 102 (e.g., from processor 104 and or channel controllers 108 via respective channels 112). These signals can include chip enable signals, write enable signals, and address latch signals that are used to control operations performed on the memory array 130, including data read, data write, and data erase operations. In various embodiments, the control component 140 is responsible for executing instructions from the host 102. Such instructions can be PIMD instructions as described herein (e.g., instructions whose corresponding operations are performed on data operands in array 130 in-situ) and/or non-PIMD instructions (e.g., instructions whose corresponding operations are performed external to array 130, such as on operands using external processor registers 107 of processor 104). The control component 140 can be a sequencer, state machine, or some other type of control component capable of controlling execution of machine-level PIMD instructions received thereto. The control component 140 can also provide a response (e.g., to host 102) indicating whether a particular PIMD instruction was executed.

Although not shown in FIG. 1, the sensing circuitry 150 can comprise, for example, a number of sense amplifiers coupled to respective columns of memory cells and corresponding compute components and can be operated (e.g., via control signals from control component 140) to execute PIMD instructions. In a number of embodiments, the sense amplifiers and corresponding compute components (which may comprise a number of transistors coupled to sense lines corresponding to the respective columns of memory cells and configured as latches) are formed on pitch with the memory cells of array 130. That is, the sense amplifiers and corresponding compute components can conform to pitch rules associated with the memory array 130. For example, the cells of memory array 130 may have a $4F^2$ or $6F^2$ cell size, where "F" is a minimum feature size corresponding to the cells. As such, the sensing circuitry 150 conforms to the corresponding pitch rules (e.g., to $4F^2$ if the cell size is $4F^2$ or to $6F^2$ if the cell size is $6F^2$, etc.). In contrast, the devices (e.g., logic gates) associated with ALU circuitry such as ALU 186 are located external to array 130 and may not be capable of being formed on pitch with the memory cells whether or not they are internal to array 130 and/or device 110.

The channel controllers 108 can control access to respective memory channels 112. The memory channels 112 can comprise a physical interface (e.g., data bus, address bus, and/or control bus) between the host 102 and memory devices 110. The channel controllers 108 comprise a translation component 109, which can be used to perform address translation functions for system 100. For example, the translation component 109 can include a memory management unit (MMU) and can be configured to perform virtual memory address to physical memory address translation, physical address to row/column translation, traditional read/write command dispatch to the memory devices 110, and PIMD instruction dispatch to the memory devices 110. The translation component 109 can be implemented in software, firmware, and/or hardware, and/or combinations thereof.

Although the example shown in FIG. 1 illustrates a system having a Von Neumann architecture, embodiments of the present disclosure can be implemented in non-Von Neumann architectures (e.g., a Turing machine, a content addressable memory (CAM), etc.), which may not include one or more components (e.g., CPU, ALU, etc.) often associated with a Von Neumann architecture.

Figure 2:
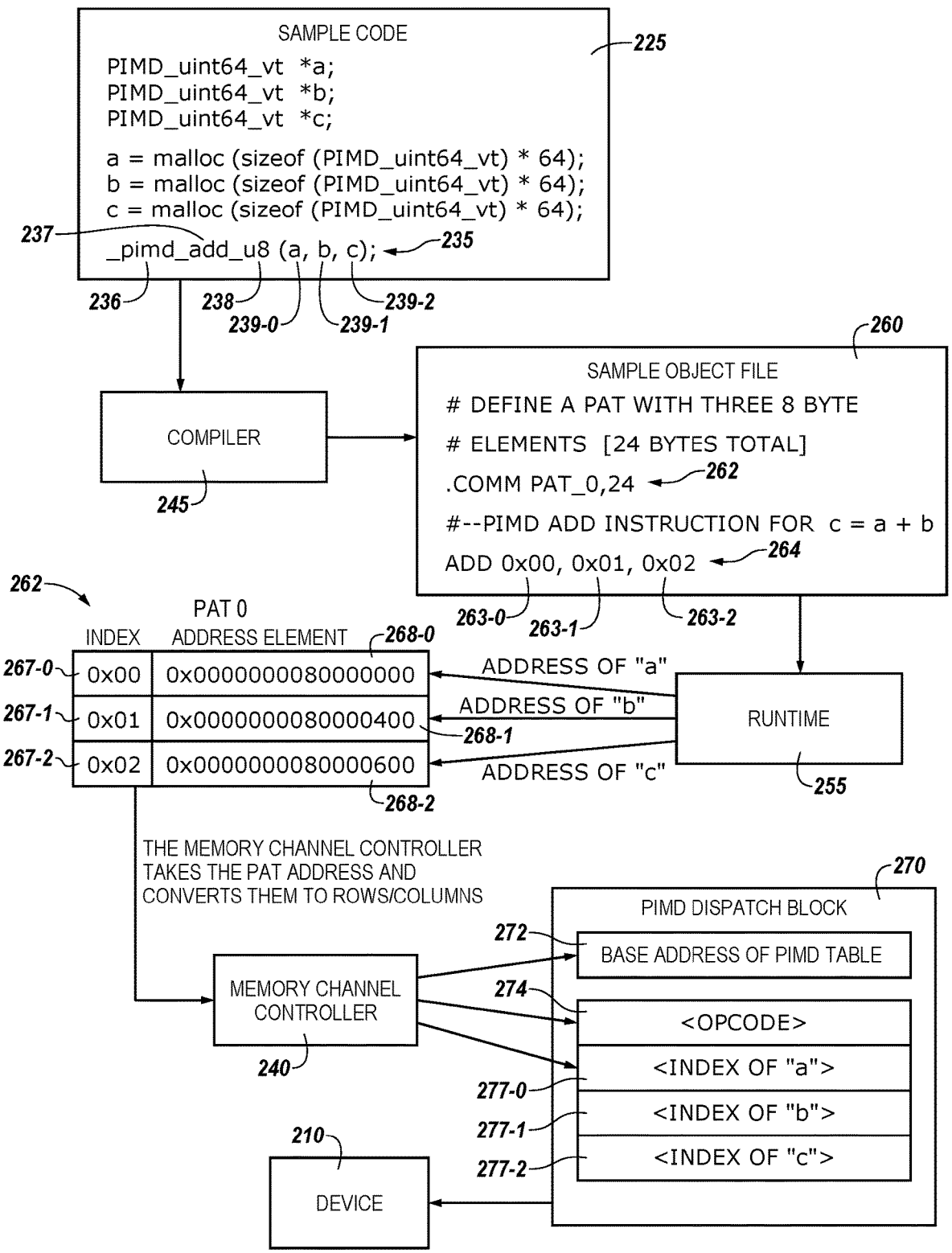
FIG. 2 is a functional block diagram illustrating a method implementing a virtual address table in accordance with a number of embodiments of the present disclosure.

FIG. 2 is a functional block diagram illustrating a method implementing a virtual address table in accordance with a number of embodiments of the present disclosure. FIG. 2 illustrates a compiler 245 configured to generate an object file 260 by compiling sample code 225 written in a particular programming language (e.g., a high level language such as)

into object code, which is written in a different language (e.g., a lower level language such as assembly language). The format of the object code of object file 260 be, for example, the Executable and Linkable Format (ELF), such that it is not bound to a particular instruction set architecture (ISA), among various other file formats.

In this example, the source code 225 comprises a PIMD (performed in memory device) instruction 235 (e.g., "_pimd_add_u8 (a, b, c)"). The format of the instruction 235 allows it to be recognized by the compiler 245 as a PIMD instruction conforming to a PIMD ISA specification, as opposed to a non-PIMD instruction, for instance, conforming to a different (e.g., non-PIMD) ISA specification). That is, the PIMD instruction 235 can be one of a number of intrinsic functions recognized by the compiler 245.

Although the source code 225 illustrates a single instruction (e.g., PIMD instruction 235), the source code 225 can comprise multiple PIMD and/or non-PIMD instructions. That is, the source code 225 could, for example, include a number of instructions (e.g., non-PIMD instructions) corresponding to operations (e.g., arithmetic operations) to be performed by transferring the corresponding operands from a memory array (e.g., array 130) to external functional unit circuitry (e.g., to registers of a host 102 and/or to other registers external to an array in which the operands are stored) and a number of instructions (e.g., 235) corresponding to operations to be performed in a memory array (e.g., array 130) in-situ (e.g., without transferring the operands from the array).

In this example, source code instruction 235 represents a PIMD addition operation with corresponding arguments 239-0 ("a"), 239-1 ("b"), and 239-1 ("c"). Argument "a" corresponds to a first operand, argument "b" corresponds to a second operand, and argument "c" corresponds to the sum of the first and second operands (e.g., c=a+b). In this example, the source code 225 indicates that the arguments "a," "b," and "c" are each arrays of 64 bit width integers (e.g., vectors) stored vertically in a memory array (e.g., such that each vector is stored in cells of a same column of the memory array) with each array comprising 64 elements (e.g., c [ ]=a [ ]+b [ ]). As such, the instruction 235 indicates that the first element (e.g., 64 bit vertically stored vector) of "a" is to be added to the first element of "b" and the sum is to be stored in the first element of "c," that the second element of "a" is to added to the second element of "b" and the sum is to be stored in the second element of "c," etc. In this example, portion 236 of the name of the instruction ("_pimd_add_u8") indicates that the type of instruction (e.g., that instruction 235 is a PIMD instruction), portion 237 of the name indicates the particular operation, and portion 238 indicates a bit width of the argument and signedness (e.g., whether the argument is a signed or unsigned integer).

Object file 260 illustrates an example object file generated by compiler 245. An object file in accordance with a number of embodiments of the present disclosure can include a number of object code instructions corresponding to respective source code instructions. For instance, the object file 260 includes an object code instruction 264 ("ADD 0x00, 0x01, 0x02") corresponding to source code instruction 235. That is, instruction 264 is the PIMD addition object code instruction for performing a summation of arguments "a" and "b" and storing the result at argument "c" (e.g., c=a+b). The object file (e.g., 260) can include a PAT (e.g., 262) for each of a number of respective PIMD source code instructions (e.g., 235). The PAT (e.g., 262) is a table of indexed address elements that serves as the target for the arguments of a corresponding object code instruction (e.g., 264). For instance, in this example, the arguments 263-0 (0x00), 263-1 (0x01), and 263-2 (0x02) of instruction 264 are indices of PAT 262.

The PAT 262 (e.g., PAT_0) includes indices 267-0 (0x00), 267-1 (0x01), and 267-2 (0x02) corresponding to respective address elements 268-0, 268-1, and 268-2 for arguments "a," "b," and "c" (e.g., the arguments of the corresponding source code instruction 235). As described further below, the address elements 268-0, 268-1, and 268-2 of PAT 262 are not populated with the virtual addresses of the respective arguments (e.g., "a," "b," and "c") until runtime. However, the size of the PAT (e.g., the quantity of entries) in the PAT (e.g., 262) can be known at compile-time and is equal to the quantity of the arguments. That is, the compiler 245 can recognize source code instruction 235 as a PIMD instruction (e.g., an instruction conforming to the PIMD ISA) and, based thereon, can determine the quantity of address arguments needed (and therefore, the quantity of PAT entries needed). In this example, the PAT generated by the compiler (e.g., PAT_0) comprises three entries corresponding to the three respective arguments "a," "b," and "c". The object code (e.g., ".COMM PAT_0, 24") corresponding to PAT 262 represents the definition of a PAT having three 8-byte address elements (24 total bytes) with each address element corresponding to an 8-byte (64-bit) virtual address; however, embodiments are not so limited.

The object file 260 can be stored in memory (e.g., as part of an executable file) and loaded to a suitable location (e.g., to a memory device 110 shown in FIG. 1) at runtime for execution. As such, the object file can be a relocatable object file that can be loaded to a different memory location each time the file (e.g., an application comprising an executable file corresponding to the object file) is executed. As used herein, "execution of an object file" can refer to execution of an executable file (e.g., application) corresponding to the object file (e.g., an executable file generated by a linker that can combine a number of object files into an executable).

During execution of an object file (e.g., 260), which may be initiated by a host (e.g., 102), the runtime (e.g., 255), which can be software executed by the host, can populate the indexed address elements of the tables corresponding to PIMD instructions (e.g., PAT 262 corresponding to instruction 264) with the appropriate virtual addresses of the corresponding arguments. In this example, address element 268-0 of PAT 262 is populated with the virtual address of "a" (e.g., 0x0000000080000000), address element 268-1 is populated with the virtual address of "b" (e.g., 0x0000000080000400), and address element 268-2 is populated with the virtual address of "c" (e.g., 0x0000000080008600).

In a number of embodiments, an instruction block conforming to the PIMD ISA specification can be generated and dispatched (e.g., by an external controller such as channel controller 108 of host 102) to a target PIMD device 210 for execution. The device 210 can be a memory device such as devices 110 shown in FIG. 1. The instruction block (which may be referred to as an instruction dispatch block) can comprise a location (e.g., base address) of a populated PAT (e.g., 262) corresponding to an instruction to be executed, an operation code (e.g., machine level code) corresponding to the instruction, and the arguments of the instruction to be executed. The arguments in the instruction block (e.g., 270) can be indices of the PAT, immediate values, and/or vector lengths.

As illustrated in FIG. 2, the instruction dispatch block 270 (e.g., "PIMD Dispatch Block") includes the base address 272 (e.g., "Base Addr of PIMD TABLE") of a corresponding PAT (which is PAT 262 in this example), the operation code 274 (e.g., "<OPCODE>") corresponding to the instruction (which is "ADD" in this example), and arguments 277-0 (e.g., "Index of 'a'"), 277-1 (e.g., "Index of 'b'"), and 277-2 (e.g., "Index of 'c'"). In this example, the instruction block conforms to a format in which the instruction block 270 comprises a series of elements of a particular size (e.g., 8-byte elements) in which the first element (e.g., 272) is the base address of the PAT, the second element (e.g., 274) is the operation code of the instruction, and the subsequent 8-byte elements (e.g., 277-0, 277-1, 277-2) are the arguments of the operation code.

In a number of embodiments, the virtual addresses with which the PAT (e.g., 262) is populated are translated (e.g., converted) to physical row and/or column indices of a particular array (e.g., array 130) prior to being provided (e.g., dispatched) to the memory device comprising the particular array. For instance, a translation component (e.g., component 109 of channel controller 108) can convert the virtual addresses of the PAT into corresponding physical addresses and subsequently to corresponding physical row and/or column addresses for the instruction arguments. Therefore, when the dispatch block (e.g., 270) is dispatched to the PIMD device 210 (e.g., to control component 140) for execution, it includes the information necessary to execute the instruction.

The device 210 can execute the operation corresponding to operation code 274 using the information provided in the instruction dispatch block 270. For instance, as described above, the operands corresponding to arguments "a" and "b," which are stored in a memory array of device 210, can be added, and the sum corresponding to argument "c" can be stored in the memory array of device 210 (e.g., without transferring the data from the array to an external register such as a processor register of a host).

Figure 3:
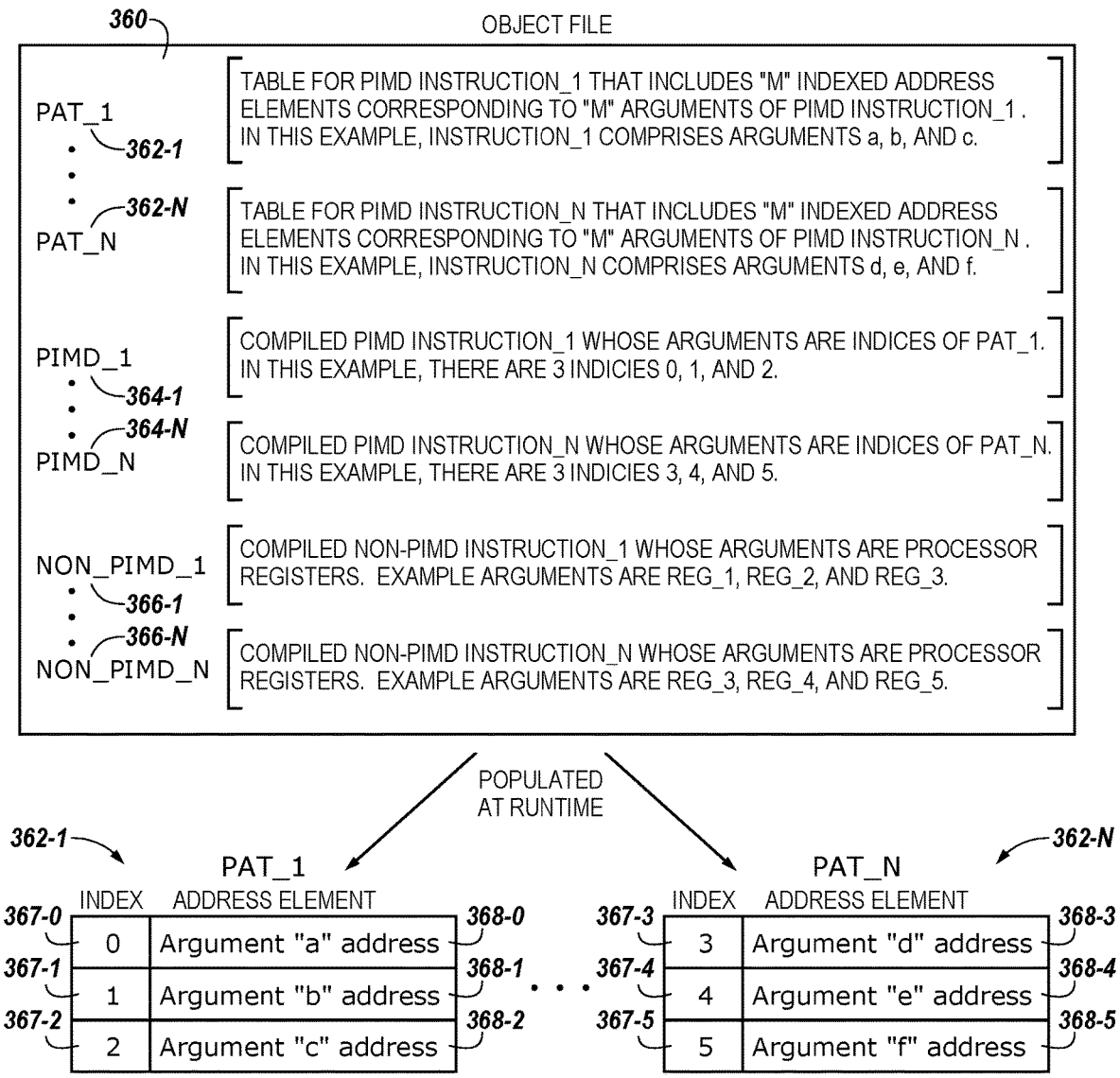
FIG. 3 illustrates an example object file comprising a number of virtual address tables in accordance with a number of embodiments of the present disclosure.

FIG. 3 illustrates an example object file 360 comprising a number of virtual address tables 362-1, . . . , 362-N in accordance with a number of embodiments of the present disclosure. The object file 360 can be an object file such as object file 260 described in association with FIG. 2. In this example, object file 360 comprises multiple PIMD object code instructions 364-1, . . . , 364-N (e.g., PIMD_1 to PIMD_N) and multiple non-PIMD object code instructions 366-1, . . . , 366-N (e.g., NON_PIMD_1 to NON_PIMD_N). The object file 360 comprises PATs 362-1, . . . , 362-N (e.g., PAT_1 to PAT_N) corresponding to respective PIMD object code instructions 364-1, . . . , 364-N.

In FIG. 3, "PIMD INSTRUCTION_1" and "PIMD INSTRUCTRION_N" represent PIMD source code instructions having "M" corresponding arguments. In this example, "M" is three and the corresponding arguments are "a," "b," and "c" for PIMD INSTRUCTION_1 and "d," "e," and "f" for PIMD INSTRUCTRION_N. It is noted that the source code PIMD instructions could have more or fewer than three arguments and could each have different numbers of arguments (e.g., "M" could be different for PIMD INSTRUCTION_1 and for PIMD INSTRUCTRION_N). The PIMD object code instructions 364-1 to 364-N represent compiled versions of PIMD source code instructions PIMD INSTRUCTION_1 to PIMD INSTRUCTION_N, respectively.

PAT 362-1 comprises a table of "M" indexed address elements corresponding to the "M" arguments of PIMD INSTRUCTION_1, and PAT 362-N comprises a table of "M" indexed address elements corresponding to the "M" arguments of PIMD INSTRUCTION_N. As noted above, in this example, "M" is three, the three arguments of PIMD INSTRUCTION_1 are "a," "b," and "c," and the three arguments of PIMD INSTRUCTION_N are "d," "e," and "f". As such, in this example, PAT 362-1 is a table comprising three indices 367-0 ("0"), 367-1 ("1"), and 367-2 ("2") and corresponding three address elements 368-0, 368-1, and 368-2. Similarly, PAT 362-N is a table comprising three indices 367-3 ("3"), 367-4 ("4"), and 367-5 ("5") and corresponding three address elements 368-3, 368-4, and 368-5.

As described above, the arguments of the PIMD object code instructions (e.g., 364-1 to 364-N) are indices of the respective corresponding PATs (e.g., 362-1 to 362-N). As such, in this example, the arguments to PIMD object code instruction 364-1 are indices "0," "1," and "2" of PAT 362-1, and the arguments to PIMD object code instruction 364-N are indices "3," "4," and "5" of PAT 362-N. The address elements (e.g., 368-1 to 368-5) of the PATs (e.g., 362-1 to 362-N) are not populated until runtime. At runtime, the address elements of the PATs are populated with the appropriate virtual addresses corresponding to the arguments. In this example, the address elements 368-0, 368-1, and 368-2 of PAT 362-1 are populated, at runtime, with the virtual addresses corresponding to respective arguments "a," "b," and "c," and the address elements 368-3, 368-4, and 368-5 of PAT 362-N are populated, at runtime, with the virtual addresses corresponding to respective arguments "d," "e," and "f".

In contrast to the PIMD object code instructions 364-1 to 364-N, the non-PIMD object code instructions 366-1 to 366-N represent compiled source code instructions whose arguments are processor registers (e.g., indices to registers) whose locations are known (e.g., fixed) at compile-time. As an example, non-PIMD object code instruction 366-1 could have arguments "Reg_1," "Reg_2," and "Reg_3" corresponding to three different processor register indices, and non-PIMD object code instruction 366-N could have arguments "Reg_3," "Reg_4," and "Reg_5" corresponding to three different processor register indices.

Since execution of PIMD instructions can include performing operations on operands stored in a memory array in-situ (e.g., without transferring the operands to an external processing resource), and since the locations of those operands may not be fixed (e.g., the object file corresponding to the PIMD instructions can be relocatable), it can be beneficial to use a PAT in accordance with embodiments described herein to provide applications with access to PIMD machine level instructions without having to bind such PIMD instructions to particular rows/columns of a particular memory array.

Figure 4:
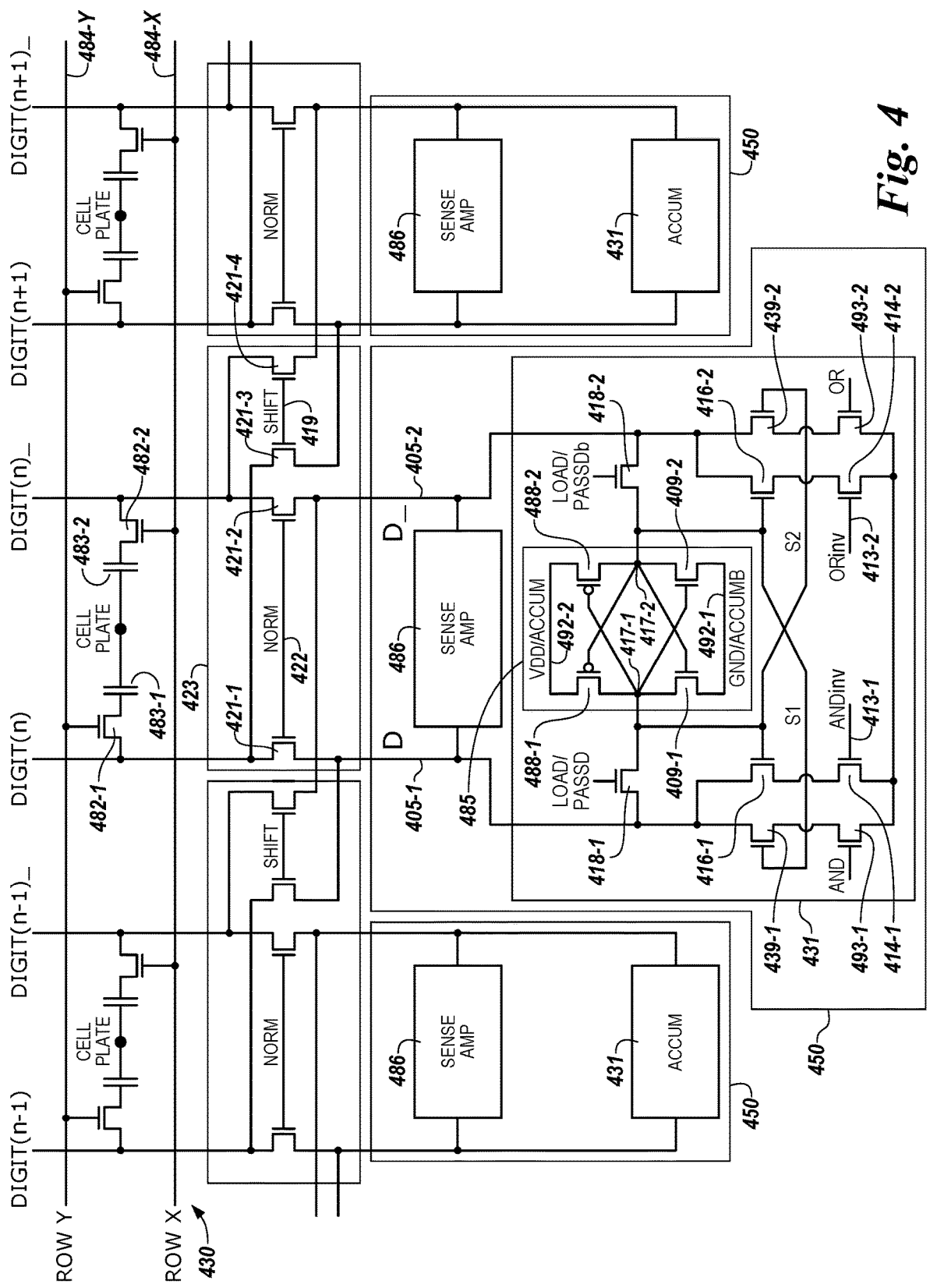
FIG. 4 illustrates a schematic diagram of a portion of a memory device operated in accordance with a number of embodiments of the present disclosure.

FIG. 4 illustrates a schematic diagram of a portion of a memory device operated in accordance with a number of embodiments of the present disclosure. The memory device shown in FIG. 4 can be a memory device such as device 110 shown in FIG. 1 and can be operated in association with executing PIMD and/or non-PIMD instructions as described herein.

The memory device shown in FIG. 4 comprises an array 430 of memory cells arranged in rows coupled by word lines 484-X (ROW X), 484-Y (ROW Y), etc., and columns coupled by pairs of complementary sense lines DIGIT(n−1)/DIGIT(n−1)_, DIGIT(n)/DIGIT(n)_, DIGIT(n+1)/DIGIT(n+1)_. In this example, the memory array 430 is a DRAM array of 1T1C (one transistor one capacitor) memory cells, with each memory cell comprising a storage element (e.g., capacitor) and an access device (e.g., transistor). For instance, one memory cell comprises transistor 482-1 and capacitor 483-1, and a different memory cell comprises transistor 482-2 and capacitor 483-2. In a number of embodiments, the memory cells may be destructive read memory cells (e.g., reading the data stored in the cell destroys the data such that the data originally stored in the cell is refreshed after being read). The individual digit lines corresponding to each pair of complementary digit lines can also be referred to as digit lines 405-1 (D) and 405-2 (D_) respectively. Although only three pair of complementary digit lines are shown in FIG. 4, embodiments of the present disclosure are not so limited, and an array of memory cells can include additional columns of memory cells and/or digit lines (e.g., 4,096, 8,192, 16,384, etc.).

In this example, a first source/drain region of a transistor 482-1 is coupled to digit line 405-1 (D), a second source/drain region of transistor 482-1 is coupled to capacitor 483-1, and a gate of a transistor 482-1 is coupled to word line 484-X. A first source/drain region of a transistor 482-2 is coupled to digit line 405-2 (D_), a second source/drain region of transistor 482-2 is coupled to capacitor 483-2, and a gate of a transistor 482-2 is coupled to word line 484-Y. The cell plate, as shown in FIG. 4, can be coupled to each of capacitors 483-1 and 483-2. The cell plate can be a common node to which a reference voltage (e.g., ground) can be applied in various memory array configurations.

The memory array 430 is coupled to sensing circuitry 450 in accordance with a number of embodiments of the present disclosure. In this example, the sensing circuitry 450 comprises a sense amplifier 486 and a compute component 431 corresponding to respective columns of memory cells (e.g., coupled to respective pairs of complementary digit lines). The sense amplifiers 486 can comprise a cross coupled latch, which can be referred to herein as a primary latch.

In the example illustrated in FIG. 4, the circuitry corresponding to compute components 431 comprises a static latch 485 and a number of additional transistors (e.g., ten additional transistors in this example) that implement, among other things, a dynamic latch. The dynamic latch and/or static latch of the compute components 431 can be collectively referred to herein as a secondary latch, which can serve as an accumulator. As such, the compute components 431 can operate as and/or can be referred to as accumulators. Each compute component 431 can be coupled to a pair of complementary digit lines (e.g., D 405-1 and D_ 405-2 as shown in FIG. 4). However, embodiments are not limited to this example.

In this example, digit line D 405-1 can be coupled to a first source/drain region of transistors 416-1 and 439-1, as well as to a first source/drain region of load/pass transistor 418-1. Digit line D_ 405-2 can be coupled to a first source/drain region of transistors 416-2 and 439-2, as well as to a first source/drain region of load/pass transistor 418-2.

The gates of load/pass transistor 418-1 and 418-2 can be commonly coupled to a LOAD control signal, or respectively coupled to a PASSD and PASSDb control signal, as discussed further below. A second source/drain region of load/pass transistor 418-1 can be directly coupled to the gates of transistors 416-1 and 439-2. A second source/drain region of load/pass transistor 418-2 can be directly coupled to the gates of transistors 416-2 and 439-1.

A second source/drain region of transistor 416-1 can be directly coupled to a first source/drain region of pull-down transistor 414-1. A second source/drain region of transistor 439-1 can be directly coupled to a first source/drain region of pull-down transistor 493-1. A second source/drain region of transistor 416-2 can be directly coupled to a first source/drain region of pull-down transistor 414-2. A second source/drain region of transistor 439-2 can be directly coupled to a first source/drain region of pull-down transistor 493-2. A second source/drain region of each of pull-down transistors 493-1, 493-2, 414-1, and 414-2 can be commonly coupled together to a reference voltage (e.g., ground (GND)). A gate of pull-down transistor 493-1 can be coupled to an AND control signal line, a gate of pull-down transistor 414-1 can be coupled to an ANDinv control signal line 413-1, a gate of pull-down transistor 414-2 can be coupled to an ORinv control signal line 413-2, and a gate of pull-down transistor 493-2 can be coupled to an OR control signal line.

The gate of transistor 439-1 can be referred to as node S1, and the gate of transistor 439-2 can be referred to as node S2. The circuit shown in FIG. 4 can store data dynamically on nodes S1 and S2 (e.g., as an accumulator data value). Activating the LOAD/PASSD and LOAD/PASSDb control signal causes respective load/pass transistors 418-1 and 418-2 to conduct, and thereby loads complementary data values (e.g., voltages corresponding to logic "1" and logic "0") onto nodes S1 and S2. The LOAD/PASSD and LOAD/PASSDb control signals can be elevated to a voltage greater than a supply voltage (e.g., $V_{DD}$) to pass a full $V_{DD}$ level (e.g., full rail) to S1/S2. However, elevating the LOAD/PASSD and/or LOAD/PASSDb control signal to a voltage greater than $V_{DD}$ is optional, and functionality of the circuit shown in FIG. 4 is not contingent on the LOAD/PASSD and/or LOAD/PASSDb control signal being elevated to a voltage greater than $V_{DD}$.

The configuration of compute component 431 shown in FIG. 4 can have the benefit of balancing the sense amplifier 486 for functionality when the pull-down transistors 493-1, 493-2, 414-1, and 414-2 are conducting before the sense amplifier 486 is enabled (e.g., before the sense amplifier 486 is fired in association with pre-seeding of the sense amplifier 486). Performing logical operations after equilibration is disabled (in the sense amplifier), but before the sense amplifier is enabled, can save power usage because the latch of the sense amplifier does not have to be "flipped" using full rail voltages (e.g., $V_{DD}$, GND). As used herein, "equilibration" can refer to providing a signal (referred to as an equilibrate signal) to circuitry corresponding to a sense amplifier (e.g., 486) in order to bring the corresponding complementary digit lines to an equilibration voltage (e.g., $V_{DD}/2$).

Inverting transistors can pull-down a respective digit line in performing certain logical operations. For example, transistor 416-1 (having a gate coupled to S2 of the dynamic latch) in series with transistor 414-1 (having a gate coupled to an ANDinv control signal line 413-1) can be operated to pull-down digit line 405-1 (D), and transistor 416-2 (having a gate coupled to S1 of the dynamic latch) in series with transistor 414-2 (having a gate coupled to an ANDinv control signal line 413-2) can be operated to pull-down digit line 405-2 (D_).

The latch 485 can be controllably enabled by coupling to an active negative control signal line 492-1 (ACCUMB) and an active positive control signal line 492-2 (ACCUM) rather than be configured to be continuously enabled by coupling to ground and $V_{DD}$. In various embodiments, load/pass transistors 488-1 and 488-2 can each having a gate coupled to one of a LOAD control signal or a PASSD/PASSDB control signal.

According to some embodiments, the gates of load/pass transistors 418-1 and 418-2 can be commonly coupled to a LOAD control signal. In the configuration in which the gates of transistors 418-1 and 418-2 are commonly coupled to the LOAD control signal, transistors 418-1 and 418-2 can be load transistors. Activating the LOAD control signal causes the load transistors to conduct, and thereby load complementary data onto nodes S1 and S2. The LOAD control signal can be elevated to a voltage greater than $V_{DD}$ to pass a full $V_{DD}$ level to S1/S2. However, the LOAD control signal need not be elevated to a voltage greater than $V_{DD}$ is optional, and functionality of the circuit shown in FIG. 4 is not contingent on the LOAD control signal being elevated to a voltage greater than $V_{DD}$.

According to some embodiments, the gate of load/pass transistor 418-1 can be coupled to a PASSD control signal, and the gate of load/pass transistor 418-2 can be coupled to a PASSDb control signal. In the configuration in which the gates of transistors 418-1 and 418-2 are respectively coupled to one of the PASSD and PASSDb control signals, transistors 418-1 and 418-2 can be pass transistors. Pass transistors can be operated differently (e.g., at different times and/or under different voltage/current conditions) than load transistors. As such, the configuration of pass transistors can be different than the configuration of load transistors.

Load transistors may be constructed to handle loading associated with coupling digit lines to the local dynamic nodes S1 and S2, for example. Pass transistors may be constructed to handle heavier loading associated with coupling digit lines to an adjacent accumulator (e.g., through the shift circuitry 423, as shown in FIG. 4). According to some embodiments, transistors 418-1 and 418-2 can be configured to accommodate the heavier loading corresponding to a pass transistor but be coupled and operated as a load transistor. Transistors 418-1 and 418-2 configured as pass transistors can also be utilized as load transistors. However, transistors 418-1 and 418-2 configured as load transistors may not be capable of being utilized as pass transistors.

In a number of embodiments, the compute component 431, including the latch 485, can comprise a number of transistors formed on pitch with the transistors of the corresponding memory cells of an array (e.g., array 430 shown in FIG. 4) to which they are coupled, which may conform to a particular feature size (e.g., $4F^2$, $6F^2$, etc.). According to various embodiments, latch 485 includes four transistors 488-1, 488-2, 409-1, and 409-2 coupled to a pair of complementary digit lines D 405-1 and D_ 405-2 through load/pass transistors 418-1 and 418-2. However, embodiments are not limited to this configuration. The latch 485 can be a cross coupled latch (e.g., gates of a pair of transistors, such as n-channel transistors (e.g., NMOS transistors) 409-1 and 409-2 are cross coupled with the gates of another pair of transistors, such as p-channel transistors (e.g., PMOS transistors) 488-1 and 488-2). As described further herein, the cross coupled latch 485 can be referred to as a static latch.

The voltages or currents on the respective digit lines D and D_ can be provided to the respective latch inputs 417-1 and 417-2 of the cross coupled latch 485. In this example, the latch input 417-1 is coupled to a first source/drain region of transistors 488-1 and 409-1 as well as to the gates of transistors 488-2 and 409-2. Similarly, the latch input 417-2 can be coupled to a first source/drain region of transistors 488-2 and 409-2 as well as to the gates of transistors 488-1 and 409-1.

In this example, a second source/drain region of transistor 409-1 and 409-2 is commonly coupled to a negative control signal line 492-1 (e.g., ground (GND) or ACCUMB control signal). A second source/drain region of transistors 488-1 and 488-2 is commonly coupled to a positive control signal line 492-2 (e.g., $V_{DD}$ or ACCUM control signal). The positive control signal 492-2 can be a supply voltage (e.g., $V_{DD}$) and the negative control signal 492-1 can be a reference voltage (e.g., ground) to enable the cross coupled latch 485. According to some embodiments, the second source/drain region of transistors 488-1 and 488-2 are commonly coupled directly to the supply voltage (e.g., $V_{DD}$), and the second source/drain region of transistor 409-1 and 409-2 are commonly coupled directly to the reference voltage (e.g., ground) so as to continuously enable latch 485.

The enabled cross coupled latch 485 operates to amplify a differential voltage between latch input 417-1 (e.g., first common node) and latch input 417-2 (e.g., second common node) such that latch input 417-1 is driven to either the activated positive control signal voltage (e.g., $V_{DD}$) or the activated negative control signal voltage (e.g., ground), and latch input 417-2 is driven to the other of the activated positive control signal voltage (e.g., $V_{DD}$) or the activated negative control signal voltage (e.g., ground).

As shown in FIG. 4, the sense amplifiers 486 and the compute components 431 can be coupled to the array 430 via shift circuitry 423. In this example, the shift circuitry 423 comprises a pair of isolation devices (e.g., isolation transistors 421-1 and 421-2) coupled to digit lines 405-1 (D) and 405-2 (D_), respectively). The isolation transistors 421-1 and 421-2 are coupled to a control signal 422 (NORM) that, when activated, enables (e.g., turns on) the isolation transistors 421-1 and 421-2 to couple the corresponding sense amplifier 486 and compute component 431 to a corresponding column of memory cells (e.g., to a corresponding pair of complementary digit lines 405-1 (D) and 405-2 (D_)). According to various embodiments, conduction of isolation transistors 421-1 and 421-2 can be referred to as a "normal" configuration of the shift circuitry 423.

In the example illustrated in FIG. 4, the shift circuitry 423 includes another (e.g., a second) pair of isolation devices (e.g., isolation transistors 421-3 and 421-4) coupled to a complementary control signal 419 (SHIFT), which can be activated, for example, when NORM is deactivated. The isolation transistors 421-3 and 421-4 can be operated (e.g., via control signal 419) such that a particular sense amp 486 and compute component 431 are coupled to a different pair of complementary digit lines (e.g., a pair of complementary digit lines different than the pair of complementary digit lines to which isolation transistors 421-1 and 421-2 couple the particular sense amplifier 486 and compute component 431), or can couple a particular sense amp 486 and compute component 431 to another memory array (and isolate the particular sense amp 486 and compute component 431 from a first memory array). According to various embodiments, the shift circuitry 423 can be arranged as a portion of (e.g., within) the sense amplifier 486, for instance.

Although the shift circuitry 423 shown in FIG. 4 includes isolation transistors 421-1 and 421-2 used to couple particular sensing circuitry 450 (e.g., a particular sense amp 486 and corresponding compute component 431) to a particular pair of complementary digit lines 405-1 (D) and 405-2 (D_) (e.g., DIGIT(n) and DIGIT(n)_) and isolation transistors 421-3 and 421-4 are arranged to couple the particular sensing circuitry 450 to an adjacent pair of complementary digit lines in one particular direction (e.g., adjacent digit lines DIGIT(n+1) and DIGIT(n+1)_ shown to the right in FIG. 4), embodiments of the present disclosure are not so limited. For instance, shift circuitry can include isolation transistors 421-1 and 421-2 used to couple particular sensing circuitry to a particular pair of complementary digit lines (e.g., DIGIT(n) and DIGIT(n)_ and isolation transistors 421-3 and 421-4 arranged so as to be used to couple the particular sensing circuitry to an adjacent pair of complementary digit lines in another particular direction (e.g., adjacent digit lines DIGIT(n−1) and DIGIT(n−1)_ shown to the left in FIG. 4).

Embodiments of the present disclosure are not limited to the configuration of shift circuitry 423 shown in FIG. 4. In a number of embodiments, shift circuitry 423 such as that shown in FIG. 4 can be operated (e.g., in conjunction with sense amplifiers 486 and compute components 431) in association with performing compute functions such as adding and subtracting functions without transferring data out of the sensing circuitry 450 via an I/O line (e.g., local I/O line (IO/IO_)), for instance.

Although not shown in FIG. 4, each column of memory cells can be coupled to a column decode line that can be activated to transfer, via local I/O line, a data value from a corresponding sense amp 486 and/or compute component 431 to a control component external to the array such as an external processing resource (e.g., host processor and/or other functional unit circuitry). The column decode line can be coupled to a column decoder. However, as described herein, in a number of embodiments, data need not be transferred via such I/O lines to perform logical operations in accordance with embodiments of the present disclosure. In a number of embodiments, shift circuitry 423 can be operated in conjunction with sense amplifiers 486 and compute components 431 to perform compute functions such as adding and subtracting functions in association with executing PIMD instructions (e.g., without transferring data to a control component external to the array), for instance.

The sensing circuitry 450 can be operated in a number of modes to perform logical operations, including a first mode in which a result of the logical operation is initially stored in the sense amp 486, and a second mode in which a result of the logical operation is initially stored in the compute component 431. Operation of the sensing circuitry 450 in the first mode is described below in association with FIGS. 5 and 6. Additionally the sensing circuitry 450 can be operated in both pre-sensing (e.g., sense amps fired before logical operation control signal active) and post-sensing (e.g., sense amps fired after logical operation control signal active) modes with a result of a logical operation being initially stored in the sense amp 486.

As described further below, the sense amp 486 can, in conjunction with the compute component 431, be operated to perform various logical operations on operands stored in array 430 without transferring the data via a digit line address access (e.g., without firing a column decode signal such that data is transferred to circuitry external from the array and sensing circuitry via local I/O lines). In a number of embodiments, the result of a logical operation can also be stored back to the array without firing a column decode signal.

Example operation of and/or functionality of the sensing circuitry 450 of FIG. 4 is described below in association with FIGS. 5 and 6 and is summarized in Table 1.

TABLE 1

| Operation | Accumulator | Sense Amp |
| --- | --- | --- |
| AND | Unchanged | Result |
| OR | Unchanged | Result |
| NOT | Unchanged | Result |
| SHIFT | Unchanged | Shifted Data |

Figure 5:
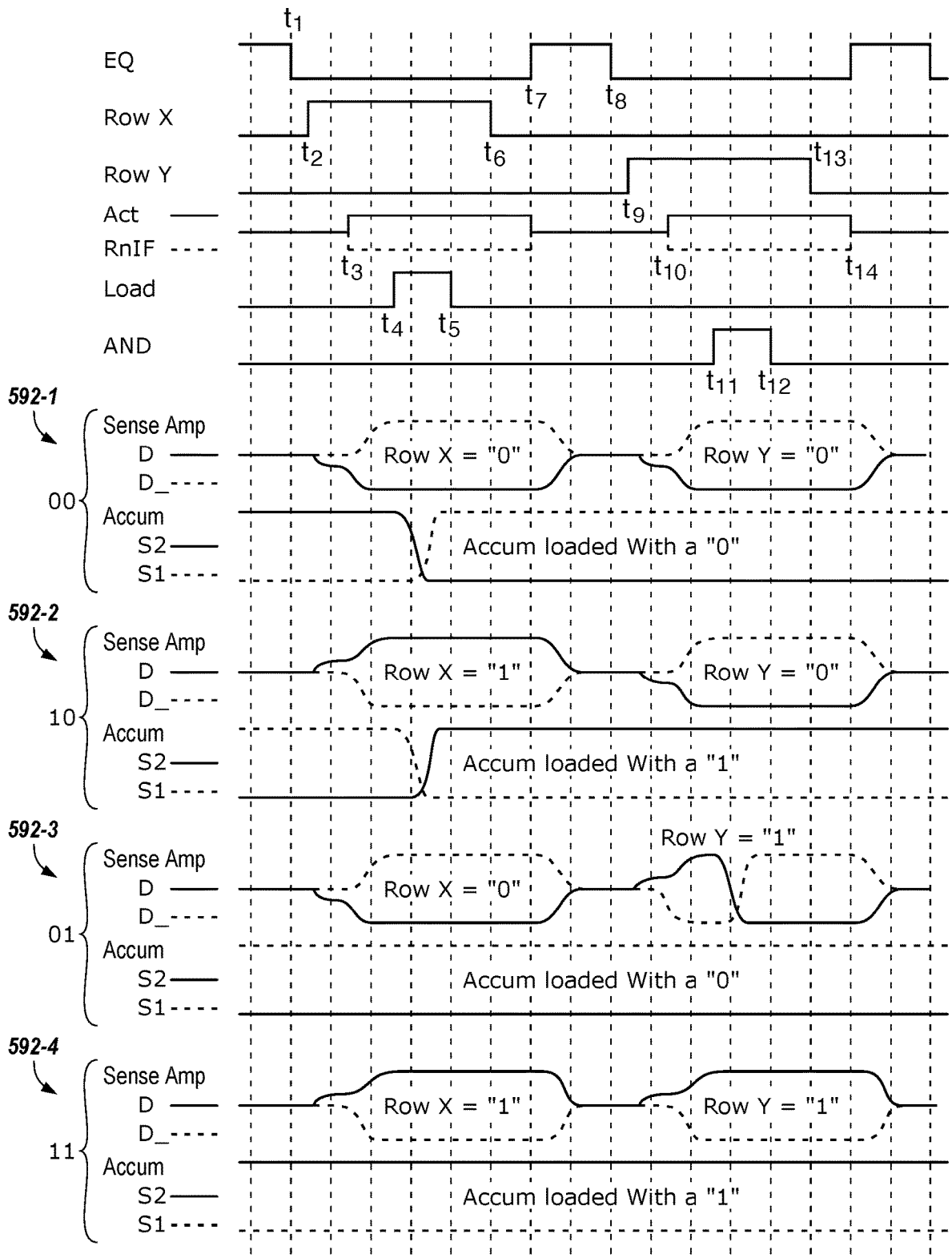
FIG. 5 illustrates a timing diagram associated with performing a number of logical operations using sensing circuitry in accordance with a number of embodiments of the present disclosure.

FIG. 5 illustrates a timing diagram associated with performing a number of logical operations using sensing circuitry in accordance with a number of embodiments of the present disclosure. FIG. 5 illustrates a timing diagram associated with performing an AND logical operation on a first operand (e.g., data value) and a second operand. In this example, the first operand is stored in a memory cell coupled to a first access line (e.g., ROW X) and the second operand is stored in a memory cell coupled to a second access line (e.g., ROW Y). Although the example refers to performing an AND on data stored in cells corresponding to one particular column, embodiments are not so limited. For instance, an entire row of data values can be ANDed, in parallel, with a different row of data values. For example, if an array comprises 2,048 columns, then 2,048 AND operations could be performed in parallel.

FIG. 5 illustrates a number of control signals associated with operating sensing circuitry (e.g., 450) to perform the AND logical operation. "EQ" corresponds to an equilibrate signal applied to the sense amp 486, "ROW X" corresponds to an activation signal applied to access line 484-X, "ROW Y" corresponds to an activation signal applied to access line 484-Y, "Act" and "RnIF" correspond to a respective positive and negative control signal applied to the sense amp 486, "LOAD" corresponds to a load control signal (e.g., LOAD/PASSD and LOAD/PASSDb shown in FIG. 4), and "AND" corresponds to the AND control signal shown in FIG. 4. FIG. 5 also illustrates the waveform diagrams 592-1, 592-2, 592-3, and 592-4 showing the signals (e.g., voltage signals) on the digit lines D and D_ corresponding to sense amp 486 and on the nodes S1 and S2 corresponding to the compute component 431 (e.g., Accum) during an AND logical operation for the various data value combinations of the Row X and Row Y data values (e.g., diagrams 592-1, 592-2, 592-3, and 592-4 correspond to respective data value combinations 00, 10, 01, 11).

Although the examples described below refer to the sensing circuitry shown in FIG. 4, embodiments are not so limited. For instance, other sensing circuitry configurations can be used to perform logical operations in association with executing PIMD instructions. Also, it is noted that although only AND, OR, and NOT logical operations are described in detail, such logical operations can be used to perform more complex operations such as arithmetic operations, for example.

An example of pseudo code associated with loading (e.g., copying) a first data value stored in a cell coupled to row 484-X into the accumulator (e.g., into a latch of the compute component 431) in association with performing an AND operation can be summarized as follows:

Copy Row X into the Accumulator:
Deactivate EQ
Activate Row X
Fire Sense Amps (after which Row X data resides in the sense amps)
Activate LOAD (sense amp data (Row X) is transferred to nodes S1 and S2 of the accumulator and resides there dynamically)
Deactivate LOAD
Deactivate Row X
Precharge In the pseudo code above, "Disable EQ" indicates that an equilibration signal (EQ signal shown in FIG. 5) corresponding to the sense amp 486 is deactivated at $t_1$ as shown in FIG. 5 (e.g., such that the complementary digit lines (e.g., 405-1 (D) and 405-2 (D_) are no longer shorted to the equilibrate voltage $V_{DD}/2$). After equilibration is deactivated, a selected row (e.g., ROW X) is activated as indicated by "Activate Row X" in the pseudo code and shown at $t_2$ for signal Row X in FIG. 5. When the voltage signal applied to ROW X reaches the threshold voltage (Vt) of the access transistor (e.g., 482-2) corresponding to the selected cell, the access transistor turns on and couples the digit line (e.g., 405-2 (D_)) to the selected cell (e.g., to capacitor 483-2) which creates a differential voltage signal between the digit lines.

After Row X is activated, in the pseudo code above, "Fire Sense Amps" indicates that the sense amp 486 is enabled. For example, as shown at $t_3$ in FIG. 5, the ACT positive control signal (e.g., 534 shown in FIG. 5) goes high and the RnIF negative control signal (e.g., 528 shown in FIG. 5) goes low, which amplifies the differential signal between 405-1 (D) and D_ 405-2, resulting in a voltage (e.g., $V_{DD}$) corresponding to a logic 1 or a voltage (e.g., GND) corresponding to a logic 0 being on digit line 405-1 (D) (and the voltage corresponding to the other logic state being on complementary digit line 405-2 (D_)). The sensed data value is stored in the sense amp 486 (e.g., the primary latch). In this example, the Row X data value is stored in the sense amp 486. That is, the sense amp 486 stores a "0" if the Row X data value is "0" (e.g., diagrams 592-1 and 592-3) and a "1" if the Row X data value is "1" (e.g., diagrams 592-2 and 592-4).

It is noted that, in FIG. 4, the Row X memory cell (e.g., the memory cell comprising access device 482-2 and storage element 483-2) is coupled to the complementary digit line D_, while the Row Y memory cell (e.g., the memory cell comprising access device 482-1 and storage element 483-1) is coupled to digit line D. Therefore, the charge stored in the Row X memory cell and corresponding to a "0" data value causes the voltage on digit line D_ (to which the Row X memory cell is coupled) to go high and the charge stored in the Row Y memory cell and corresponding to a "1" data value causes the voltage on digit line D_ to go low. As such, there is opposite correspondence between data states and charge stored for the Row X and Row Y memory cells. Therefore, writing a "1" to the Row X memory cell includes storing a different voltage on the corresponding storage element 482-2 than the voltage stored on storage element 482-1 of the Row Y memory cell in order to write a "1."

After firing the sense amps, in the pseudo code above, "Activate LOAD" indicates that the LOAD control signal goes high as shown at $t_4$ in FIG. 5, causing load transistors 418-1 and 418-2 to conduct. In this manner, activating the LOAD control signal enables the secondary latch of the compute component 431 (e.g., accumulator). The sensed data value stored in the sense amp 486 is transferred (e.g., copied) to the secondary latch. As shown in diagrams 592-1 to 592-4, the behavior at inputs (e.g., nodes S1 and S2) of the secondary latch (e.g., Accum) indicates the secondary latch is loaded with the Row X data value. As shown in FIG. 5, the value stored in the secondary latch of the Accumulator (e.g., stored dynamically on nodes S1 and S2) may flip as shown in diagrams 592-1 and 592-2, or not flip as shown in diagrams 592-3 and 592-4, depending on the data value previously stored in the secondary latch.

After loading the secondary latch with the data value stored in the sense amp (and present on the digit lines 405-1 (D) and 405-2 (D_), in the pseudo code above, "Deactivate LOAD" indicates that the LOAD control signal goes back low as shown at $t_5$ in FIG. 5 to cause the load transistors 418-1 and 418-2 to stop conducting and thereby isolate the secondary latch from the complementary digit lines. However, the data value remains dynamically stored in the secondary latch.

After storing the data value in the secondary latch, the activated row (e.g., ROW X) is deactivated as indicated by "Deactivate Row X" and shown at $t_6$ in FIG. 5, which can disable (e.g., turn off) the access transistor (e.g., 482-2) to decouple the selected cell from the corresponding digit line. Once the selected row is deactivated and the memory cell is isolated from the digit lines, the digit lines can be precharged as indicated by the "Precharge" in the pseudo code above. A precharge of the digit lines can be accomplished by an equilibrate operation, as indicated in FIG. 5 by the EQ signal going high at $t_7$. As shown in each of the diagrams 592-1 to 592-4, at $t_7$, the equilibrate operation causes the voltage on digit lines D and D_ to each return to $V_{DD}/2$. Equilibration can occur, for instance, prior to a memory cell sensing operation and/or prior to the logical operation phase (described below).

A subsequent operation phase associated with performing an AND or an OR operation on the first data value (now stored in the sense amp 486 and the secondary latch of the compute component 431) and the second data value (stored in Row Y memory cell comprising access device 482-1 and storage element 483-1) includes performing particular steps which depend on the whether an AND or an OR is to be performed. Examples of pseudo code associated with "ANDing" and "ORing" the first data value (e.g., the Row X data value residing in the secondary latch) and the second data value (e.g., the Row Y data value) are summarized below. Example pseudo code associated with "ANDing" the data values can include:

Deactivate EQ
Activate Row Y
Fire Sense Amps (after which Row Y data resides in the sense amps)
Deactivate Row Y
    The result of the logic operation, in the next operation, will be
        placed on the sense amp, which will overwrite any row that is
        activated (e.g., open).
    Even when Row Y is deactivated (e.g., closed), the sense amp still
        contains the Row Y data value.
Activate AND
    This results in the sense amp being written to the value of the
        function (e.g., Row X AND Row Y)
    If the accumulator contains a "0" (i.e., a voltage corresponding to a
        "0" on node S2 and a voltage corresponding to a "1" on node
        S1), the sense amp data is written to a "0"
    If the accumulator contains a "1" (i.e., a voltage corresponding to a
        "1" on node S2 and a voltage corresponding to a "0" on node
        S1), the sense amp data remains unchanged (Row Y data)
    This operation leaves the data in the accumulator unchanged.
Deactivate AND
Precharge As shown in FIG. 5, at $t_8$ equilibration is disabled (e.g., EQ goes low), and at $t_9$ the selected row (e.g., ROW Y) is activated as indicated in the pseudo code above by "Activate Row Y". When the voltage signal applied to ROW Y reaches the threshold voltage (Vt) of the access transistor (e.g., 482-1) corresponding to the selected Row Y cell, the access transistor turns on and couples the digit line (e.g., D_ 405-1) to the selected cell (e.g., to capacitor 483-1) which creates a differential voltage signal between the digit lines.

After Row Y is activated, in the pseudo code above, "Fire Sense Amps" indicates that the sense amp 486 is enabled to amplify the differential signal between 405-1 (D) and 405-2 (D), resulting in a voltage (e.g., $V_{DD}$) corresponding to a logic 1 or a voltage (e.g., GND) corresponding to a logic 0 being on digit line 405-1 (D) (and the voltage corresponding to the other logic state being on complementary digit line 405-2 (D_)). As shown at $t_{10}$ in FIG. 5, the ACT positive control signal goes high and the RnIF negative control signal goes low to enable (e.g., fire) the sense amps. The sensed data value from the Row Y memory cell is stored in the primary latch of sense amp 486, as previously described. The secondary latch still stores the data value from the Row X memory cell 482-2 previously copied thereto (e.g., the value stored in the dynamic latch via nodes S1 and S2 is unchanged).

After the second data value (e.g., the data value stored in the Row Y memory cell) is stored in the primary latch of sense amp 486, the selected row (e.g., ROW Y) can be deactivated (e.g., as indicated by "Close Row Y") if it is not desired to store the result of the AND logical operation back in the Row Y memory cell. However, FIG. 5 shows that Row Y is left activated (e.g., open) such that the result of the logical operation (e.g., the result of the AND operation) can be stored back in the Row Y memory cell. Isolating the Row Y memory cell can be accomplished by disabling (e.g., turning off) the access transistor 482-1 to decouple the selected Row Y cell from the digit line 405-1 (D). After the selected Row Y is configured (e.g., to isolate or to not isolate the Row Y memory), the AND control signal goes high (e.g., as shown in FIG. 5 at $t_{11}$ and as indicated as "Activate AND" in the pseudo code above), causing pass transistor 493-1 to conduct. In this manner, activating the AND control signal causes the result of the logical operation (e.g., the value of Row X AND Row Y) to be written to the sense amp 486.

With the first data value (e.g., the data value of the Row X memory cell) stored in the compute component 331 (e.g., in the secondary latch serving as an accumulator) and the second data value (e.g., the data value of the Row Y memory cell) stored in the sense amp 486, if the secondary latch contains a "0" (e.g., a voltage corresponding to a "0" on node S2 and a voltage corresponding to a "1" on node S1), the sense amp data is written to a "0" (regardless of the data value previously stored in the sense amp) since the voltage corresponding to a "1" on node S1 causes transistor 409-1 to conduct thereby coupling the sense amp 486 to ground through transistor 409-1, pass transistor 493-1 and digit line 405-1 (D). It is noted that when any operand of a logical AND operation is "0," the result is a "0." In this example, when the second data value (e.g., the data value stored in the secondary latch) is a "0," the result of the AND operation is a "0" regardless of first data value. As such, the result of the AND operation (e.g., logic "0") is initially stored in the sense amp 486 and the data value in the secondary latch (e.g., accumulator) is unchanged (e.g., it retains the Row X data value).

If the secondary latch stores a "1" (e.g., the Row X data value is a "1"), then the result of the AND operation depends on the data value stored in the sense amp 486 (e.g., the Row Y data value). The result of the AND operation should be a "1" if the Row Y data value stored in the sense amp 486 is also a "1," but the result of the AND operation should be a "0" if the Row Y data value stored in the sense amp 486 is a "0." The sensing circuitry 450 is configured such that if the secondary latch contains a "1" (e.g., a voltage corresponding to a "1" on node S2 and a voltage corresponding to a "0" on node S1), transistor 409-1 does not conduct, the sense amp is not coupled to ground (as described above), and the data value previously stored in the sense amp 486 (e.g., the Row Y data value) remains unchanged. As such, the AND operation result is a "1" if the Row Y data value is a "1" and the AND operation result is a "0" if the Row Y data value is a "0"). This operation leaves the data value in the secondary latch (e.g., the Row X data value) unchanged.

As indicated in FIG. 5, at $t_{12}$ the AND control signal goes low (e.g., "Deactivate AND" as shown in the above pseudocode), causing pass transistor 493-1 to stop conducting to isolate the sense amp 486 (and digit line 405-1 (D)) from ground. If not previously done, Row Y can be deactivated (as shown at $t_{13}$ in FIG. 5) and the sense amp 486 can be disabled (as shown at $t_{14}$ in FIG. 5 by the ACT positive control signal going low and the RnIF negative control signal going high). With the digit lines isolated, a "Precharge" can be performed to precharge the digit lines (e.g., via an equilibrate operation) as described previously (e.g., as indicated by the EQ signal going high at $t_{14}$ shown in FIG. 5).

FIG. 5 shows, in the alternative, the behavior of voltage signals on the digit lines (e.g., 405-1 (D) and 405-2 (D_) shown in FIG. 4) coupled to the sense amp (e.g., 486 shown in FIG. 4) and the behavior of voltage signals on nodes S1 and S1 of the secondary latch of the compute component (e.g., 431 shown in FIG. 4) for an AND logical operation involving each of the possible combinations of operands (e.g., Row X/Row Y data values 00, 10, 01, and 11).

Although the timing diagrams illustrated in FIG. 5 and the pseudo code described above indicate initiating the AND logical operation after starting to load the second operand (e.g., Row Y data value) into the sense amplifier, the circuit shown in FIG. 4 can be operated by initiating the AND logical operation before starting to load the second operand (e.g., Row Y data value) into the sense amplifier.

Figure 6:
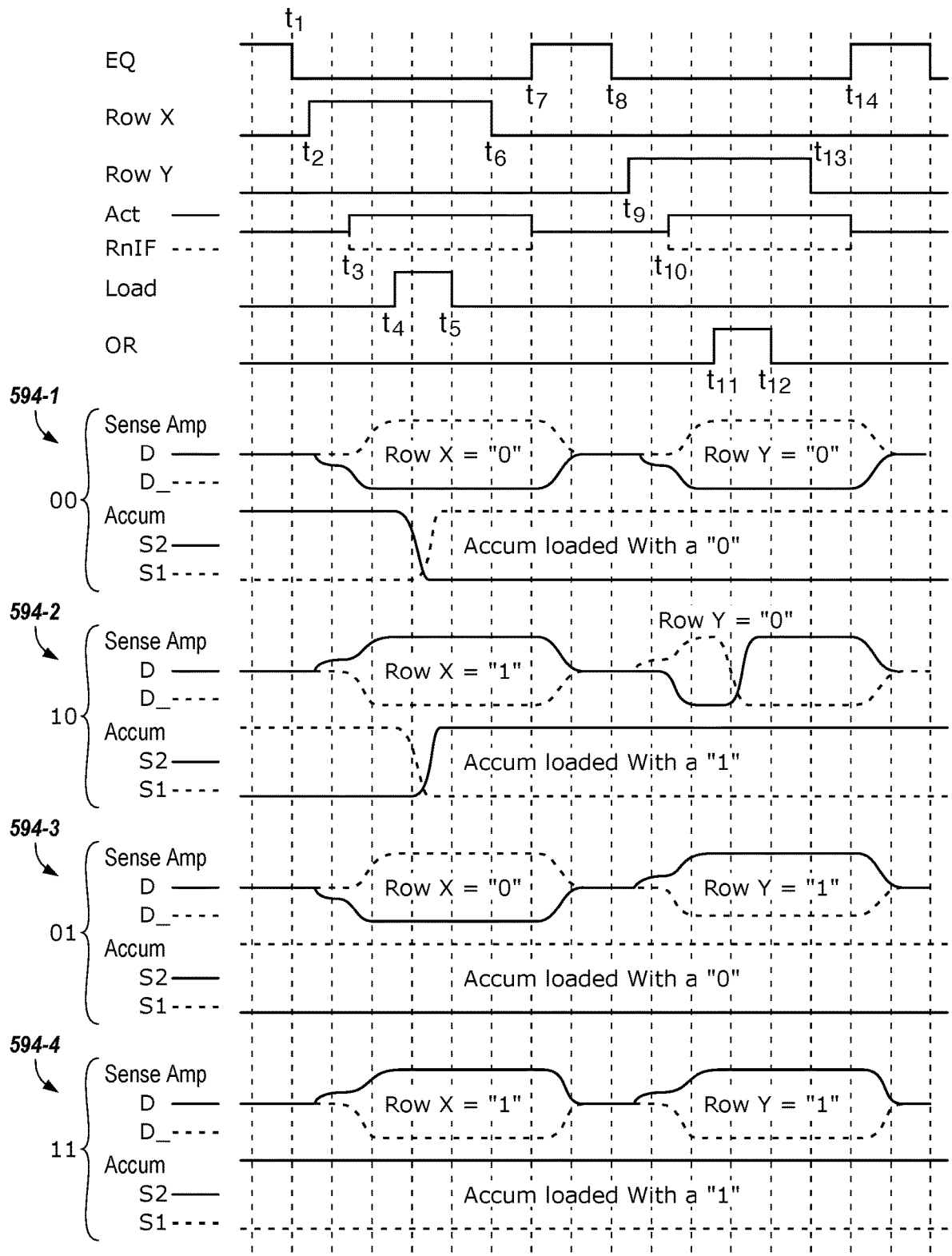
FIG. 6 illustrates a timing diagram associated with performing a number of logical operations using sensing circuitry in accordance with a number of embodiments of the present disclosure.

FIG. 6 illustrates a timing diagram associated with performing a number of logical operations using sensing circuitry in accordance with a number of embodiments of the present disclosure. FIG. 6 illustrates a timing diagram associated with performing an OR logical operation on a first operand (e.g., data value) and a second operand. In this example, the first operand is stored in a memory cell coupled to a first access line (e.g., ROW X) and the second operand is stored in a memory cell coupled to a second access line (e.g., ROW Y).

FIG. 6 illustrates a number of control signals associated with operating sensing circuitry (e.g., 450) to perform the AND logical operation. "EQ" corresponds to an equilibrate signal applied to the sense amp 486, "ROW X" corresponds to an activation signal applied to access line 484-X, "ROW Y" corresponds to an activation signal applied to access line 484-Y, "Act" and "RnIF" correspond to a respective positive and negative control signal applied to the sense amp 486, "LOAD" corresponds to a load control signal (e.g., LOAD/PASSD and LOAD/PASSDb shown in FIG. 4), and "OR" corresponds to the OR control signal shown in FIG. 4. FIG. 6 also illustrates the waveform diagrams 694-1, 694-2, 694-3, and 694-4 showing the signals (e.g., voltage signals) on the digit lines D and D_ corresponding to sense amp 486 and on the nodes S1 and S2 corresponding to the compute component 431 (e.g., Accum) during an OR logical operation for the various data value combinations of the Row X and Row Y data values (e.g., diagrams 694-1, 694-2, 694-3, and 694-4 correspond to respective data value combinations 00, 10, 01, 11).

The OR operation described below assumes that the Row X data value as been loaded into the sense amp 486 and into the secondary latch (e.g., accumulator) of the compute component 431 as previously described in association with FIG. 5 (e.g., times $t_1$-$t_7$ shown in FIG. 5). Example pseudo code associated with "ORing" the data values can include:

Deactivate EQ
Activate Row Y
Fire Sense Amps (after which Row Y data resides in the sense amps)

-continued

Deactivate Row Y
    When Row Y is deactivated (e.g., closed), the sense amp still
        contains the Row Y data value.
Activate OR
    This results in the sense amp being written to the value of the
        logical operation (e.g., Row X OR Row Y), which may
        overwrite the data value from Row Y previously stored in
        the sense amp as follows:
        If the accumulator contains a "0" (i.e., a voltage corresponding to a
            "0" on node S2 and a voltage corresponding to a "1" on node
            S1), the sense amp data remains unchanged (Row Y data)
        If the accumulator contains a "1" (i.e., a voltage corresponding to a
            "1" on node S2 and a voltage corresponding to a "0" on node
            S1), the sense amp data is written to a "1"
        This operation leaves the data in the accumulator unchanged.
Deactivate OR
Precharge The "Deactivate EQ" (shown at $t_8$ in FIG. 6), "Activate Row Y" (shown at $t_9$ in FIG. 6), "Fire Sense Amps" (shown at $t_{10}$ in FIG. 6), and "Deactivate Row Y" (shown at $t_{13}$ in FIG. 6, and which may occur prior to initiating the particular logical function control signal), shown in the pseudo code above indicate the same functionality as previously described with respect to the AND operation pseudo code. Row Y can be appropriately configured (e.g., activated if logical operation result is to be stored in the Row Y memory cell or deactivated to isolate the Row Y memory cell if result if logical operation is not to be stored in the Row Y memory cell). The OR control signal can then be activated (e.g., at $t_{11}$ in FIG. 6), as indicated by "Open OR" in the pseudo code above, which causes pass transistor 493-2 to conduct. In this manner, activating the OR control signal causes the resultant value of the operation (e.g., Row X OR Row Y) to be stored in the sense amp 486.

With the Row X data value (e.g., the first data value) stored in the secondary latch and the Row Y data value (e.g., the second data value) stored in the sense amp 486, if the secondary latch (e.g., Accum) contains a "0" (e.g., a voltage corresponding to a "0" on node S2 and a voltage corresponding to a "1" on node S1), then the result of the OR operation depends on the data value stored in the sense amp 486 (e.g., the Row Y data value). The result of the OR operation should be a "1" if the Row Y data value stored in the sense amp 486 is a "1," but the result of the OR operation should be a "0" if the Row Y data value stored in the sense amp 486 is a "0." The sensing circuitry 450 is configured such that if the secondary latch contains a "0," with the voltage corresponding to a "0" on node S2, transistor 409-2 is off and does not conduct (and pass transistor 493-1 is also off since the AND control signal is not asserted) so the sense amp 486 is not coupled to ground (e.g., at either input), and the data value previously stored in the sense amp 486 remains unchanged (e.g., Row Y data value such that the OR operation result is a "1" if the Row Y data value is a "1" and the OR operation result is a "0" if the Row Y data value is a "0").

If the secondary latch contains a "1" (e.g., a voltage corresponding to a "1" on node S2 and a voltage corresponding to a "0" on node S1), transistor 409-2 conducts (as does pass transistor 493-2 since the OR control signal is asserted), and the sense amp 486 input coupled to digit line 405-2 (D_) is coupled to ground since the voltage corresponding to a "1" on node S2 causes transistor 409-2 to conduct along with pass transistor 493-2 (which also conducts since the OR control signal is asserted). In this manner, a "1" is initially stored in the sense amp 486 as a result of the OR operation when the secondary latch contains a "1" regardless of the data value previously stored in the sense amp 486. This operation leaves the data in the accumulator unchanged. FIG. 6 shows, in the alternative, the behavior of voltage signals on the digit lines (e.g., 405-1 (D) and 405-2 (D_) shown in FIG. 6) coupled to the sense amp (e.g., 486 shown in FIG. 6) and the behavior of voltage signals on nodes S1 and S2 of the secondary latch of the compute component 431 for an OR logical operation involving each of the possible combination of operands (e.g., Row X/Row Y data values 00, 10, 01, and 11).

After the result of the OR operation is initially stored in the sense amp 486, the OR control signal goes low as shown at $t_{12}$ in FIG. 6 and as indicated by "Deactivate OR" in the pseudo code above, which causes pass transistor 493-2 to stop conducting and isolates the sense amp 486 (and digit line D 405-2) from ground. If not previously deactivated, Row Y can be deactivated (as shown at $t_{13}$ in FIG. 6) and the sense amp 486 can be disabled (as shown at $t_{14}$ in FIG. 6 by the ACT positive control signal going low and the RnIF negative control signal going high). With the digit lines D/D_ isolated, a precharge of the digit lines can be performed as indicated by "Precharge" in the pseudocode above.

The sensing circuitry 450 shown in FIG. 4 can also be operated to perform a NOT (e.g., invert) operation by loading a non-inverted data value into the secondary latch (e.g., accumulator) of the compute component 531 and using that data value to invert the data value in the sense amp 486. For instance, enabling the ORinv control signal causes transistor 414-1 to conduct and enabling the ANDinv control signal causes transistor 414-2 to conduct. Example pseudocode associated with performing a NOT operation includes:

Copy Row X into the Accumulator
    Deactivate EQ
    Activate Row X
    Fire Sense Amps (after which Row X data resides in the sense
        amps)
    Activate LOAD (sense amp data (Row X) is transferred to nodes
        S1 and S2 of the Accumulator and resides there dynamically
    Deactivate LOAD
    Activate ANDinv and ORinv (which puts the compliment data
        value on the digit lines)
        This results in the data value in the sense amp being inverted
            (e.g., the sense amp latch is flipped)
        This operation leaves the data in the accumulator unchanged
    Deactivate ANDinv and ORinv
    Deactivate Row X
    Precharge The "Deactivate EQ," "Activate Row X," "Fire Sense Amps," "Activate LOAD," and "Deactivate LOAD" shown in the pseudo code above indicate the same functionality as the same operations in the pseudo code for the "Copy Row X into the Accumulator" initial operation phase described above prior to pseudo code for the AND operation and OR operation. However, rather than deactivating Row X and Precharging after the Row X data is loaded into the sense amp 486 and copied into the secondary latch, a compliment version of the data value in the secondary latch can be placed on the digit line and thus transferred to the sense amp 486 by enabling and disabling the appropriate invert transistors (e.g., via the ANDinv and ORinv signals). This results in the sense amp 486 being flipped from the true data value that was previously stored in the sense amp to a compliment data value (e.g., inverted data value) stored in the sense amp. That is, a true or compliment version of the data value in the accumulator can be transferred to the sense amp 486 by activating and deactivating ANDinv and ORinv. This operation leaves the data in the accumulator unchanged.

Because the sensing circuitry 450 shown in FIG. 4 initially stores the result of the AND, OR, and NOT logical operations in the sense amp 486 (e.g., on the sense amp nodes), these logical operation results can be communicated easily and quickly to an activated (e.g., open) row(s), a row(s) opened after the logical operation is complete, and/or into the secondary latch of the compute component 431. The sense amp 486 and sequencing for the AND, OR, and/or NOT logical operations can also be interchanged by appropriate activation/deactivation of the AND, OR, ANDinv, and/or ORinv control signals (and operation of corresponding transistors having a gate coupled to the particular control signal) before the sense amp 486 fires.

When performing logical operations in this manner, the sense amp 486 can be pre-seeded with a data value from the secondary latch, which can reduce overall current utilized because the sense amps 486 may not be at full rail voltages (e.g., supply voltage or ground/reference voltage) when the value stored in the secondary latch is copied to the sense amp 486. An operation sequence with a pre-seeded sense amp 486 may either force one of the digit lines to the reference voltage (leaving the complementary digit line at $V_{DD}/2$, or may leave the complementary digit lines unchanged. The sense amp 486 pulls the respective digit lines to full rails when the sense amp 486 fires. Using this sequence of operations will overwrite data in an open Row.

As noted above, according to embodiments of the present disclosure, the shift circuitry 423 can be used for shifting data values within the array 430. Example pseudocode for a shift right of data values stored in memory cells coupled to Row X can be summarized as follows:

Deactivate Norm and Activate Shift
Deactivate EQ
Activate Row X
Fire Sense Amps (after which shifted Row X data resides in the sense amps)
Activate Norm and Deactivate Shift
Deactivate Row X
Precharge In the pseudo code above, "Deactivate Norm and Activate Shift" indicates that a NORM control signal goes low causing isolation transistors 421-1 and 421-2 of the shift circuitry 423 to not conduct, which isolates the sense amp 486 from the corresponding pair of complementary digit lines. The SHIFT control signal goes high causing isolation transistors 421-3 and 421-4 to conduct, thereby coupling the sense amp 486 to the left adjacent pair of complementary digit lines (e.g., on the memory array side of non-conducting isolation transistors 421-1 and 421-2 for the left adjacent pair of complementary digit lines).

After the shift circuitry 423 is configured, the "Deactivate EQ," "Activate Row X," and "Fire Sense Amps" shown in the pseudo code above indicate the same functionality as the same operations in the pseudo code for the "Copy Row X into the Accumulator" initial operation phase described above in association with the pseudo code for the AND and OR logical operations. After these operations, the Row X data value for the memory cell coupled to the left adjacent pair of complementary digit lines is shifted right and stored in the sense amp 486.

In the pseudo code above, "Activate Norm and Deactivate Shift" indicates that a NORM control signal goes high causing isolation transistors 421-1 and 421-2 of the shift circuitry 423 to conduct, which couples the sense amp 486 to the corresponding pair of complementary digit lines, and the SHIFT control signal goes low causing isolation transistors 421-3 and 421-4 to not conduct and isolating the sense amp 486 from the left adjacent pair of complementary digit lines (e.g., on the memory array side of non-conducting isolation transistors 421-1 and 421-2 for the left adjacent pair of complementary digit lines). Since Row X is still open, the Row X data value that has been shifted right is transferred to the Row X memory cell coupled to the corresponding pair of complementary digit lines through isolation transistors 421-1 and 421-2.

After the Row X data values are shifted right to the corresponding pair of complementary digit lines, the selected row (e.g., ROW X) is disabled as indicated by "Deactivate Row X" in the pseudo code above, which can be accomplished by the access transistor turning off to decouple the selected cell from the corresponding digit line. Once the selected row is closed and the memory cell is isolated from the digit lines, the digit lines can be precharged as indicated by the "Precharge" in the pseudo code above. A precharge of the digit lines can be accomplished by an equilibrate operation, as described above.

Figure 7:
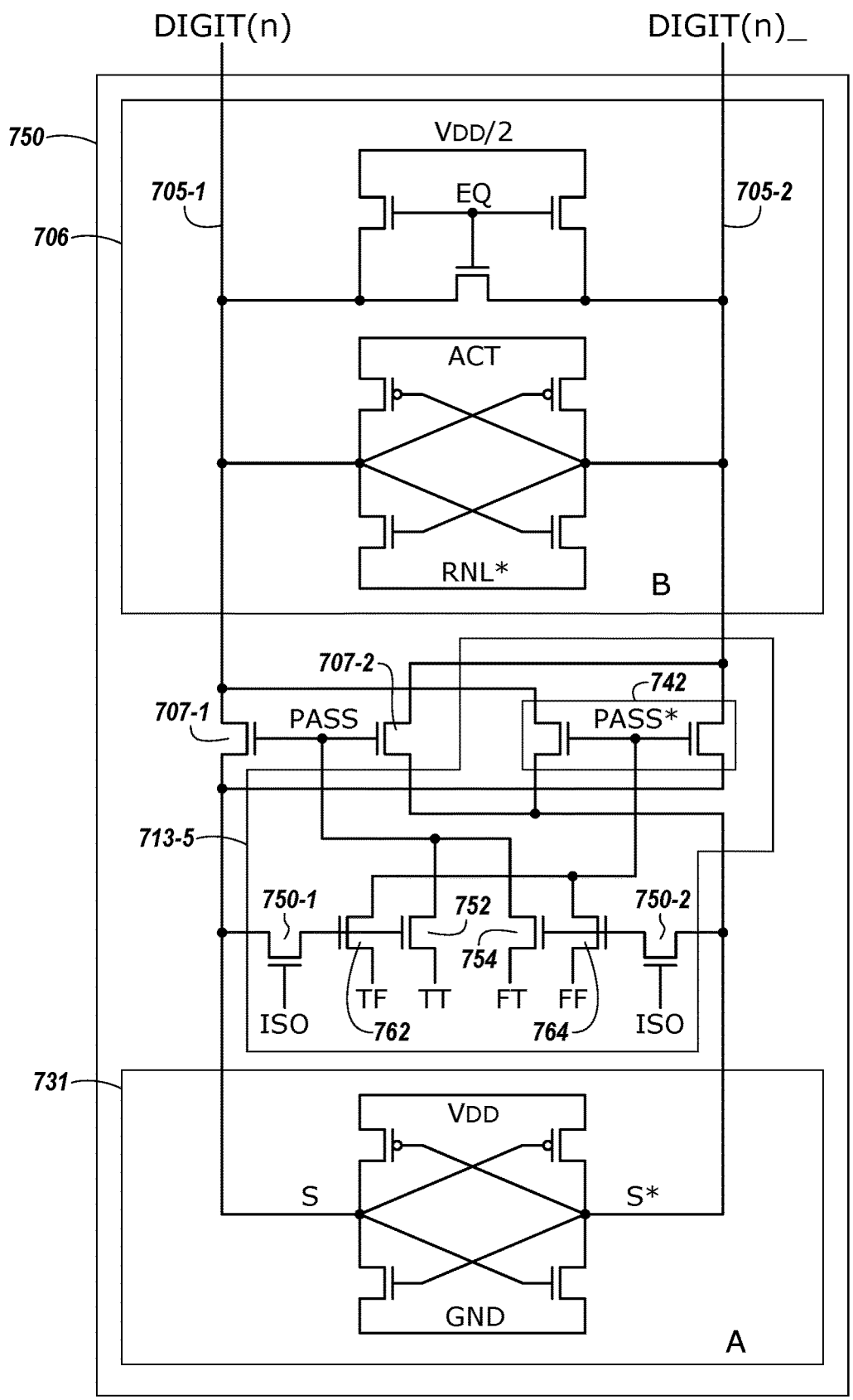
FIG. 7 is a schematic diagram illustrating sensing circuitry having selectable logical operation selection logic in accordance with a number of embodiments of the present disclosure.

Example pseudocode for a shift left of data values stored in memory cells coupled to Row X can be summarized as follows:

Activate Norm and Deactivate Shift
Deactivate EQ
Activate Row X
Fire Sense Amps (after which Row X data resides in the sense amps)
Deactivate Norm and Activate Shift
Sense amp data (shifted left Row X) is transferred to Row X
Deactivate Row X
Precharge FIG. 7 is a schematic diagram illustrating sensing circuitry having selectable logical operation selection logic in accordance with a number of embodiments of the present disclosure. FIG. 7 shows a sense amplifier 706 coupled to a pair of complementary sense lines 705-1 and 705-2, and a compute component 731 coupled to the sense amplifier 706 via pass gates 707-1 and 707-2. The gates of the pass gates 707-1 and 707-2 can be controlled by a logical operation selection logic signal, PASS, which can be output from logical operation selection logic 713-5. FIG. 7 shows the compute component 731 labeled "A" and the sense amplifier 706 labeled "B" to indicate that the data value stored in the compute component 731 is the "A" data value and the data value stored in the sense amplifier 706 is the "B" data value shown in the logic tables illustrated with respect to FIG. 9.

The sensing circuitry 750 illustrated in FIG. 7 includes logical operation selection logic 713-5. In this example, the logic 713-5 comprises swap gates 742 controlled by a logical operation selection logic signal PASS*. The logical operation selection logic 713-5 also comprises four logic selection transistors: logic selection transistor 762 coupled between the gates of the swap transistors 742 and a TF signal control line, logic selection transistor 752 coupled between the gates of the pass gates 707-1 and 707-2 and a TT signal control line, logic selection transistor 754 coupled between the gates of the pass gates 707-1 and 707-2 and a FT signal control line, and logic selection transistor 764 coupled between the gates of the swap transistors 742 and a FF signal control line. Gates of logic selection transistors 762 and 752 are coupled to the true sense line (e.g., 705-1) through isolation transistor 750-1 (having a gate coupled to an ISO signal control line), and gates of logic selection transistors 764 and 754 are coupled to the complementary sense line (e.g., 705-2) through isolation transistor 750-2 (also having a gate coupled to an ISO signal control line).

Logic selection transistors 752 and 754 are arranged similarly to transistor 493-1 (coupled to an AND signal control line) and transistor 493-2 (coupled to an OR signal control line) respectively, as shown in FIG. 4. Operation of logic selection transistors 752 and 754 are similar based on the state of the TT and FT selection signals and the data values on the respective complementary sense lines at the time the ISO signal is asserted. Logic selection transistors 762 and 764 also operate in a similar manner to control continuity of the swap transistors 742. That is, to enable (e.g., turn on) the swap transistors 742, either the TF control signal is activated (e.g., high) with data value on the true sense line being "1," or the FF control signal is activated (e.g., high) with the data value on the complement sense line being "1." If either the respective control signal or the data value on the corresponding sense line (e.g., sense line to which the gate of the particular logic selection transistor is coupled) is not high, then the swap transistors 742 will not be enabled by a particular logic selection transistor.

The PASS* control signal is not necessarily complementary to the PASS control signal. For instance, it is possible for the PASS and PASS* control signals to both be activated or both be deactivated at the same time. However, activation of both the PASS and PASS* control signals at the same time shorts the pair of complementary sense lines together, which may be a disruptive configuration to be avoided. Logical operations results for the sensing circuitry illustrated in FIG. 7 are summarized in the logic table illustrated in FIG. 8.

FIG. 10 is a logic table illustrating selectable logic operation results implementable by the sensing circuitry shown in FIG. 7 in accordance with a number of embodiments of the present disclosure. The four logic selection control signals (e.g., TF, TT, FT, and FF), in conjunction with a particular data value present on the complementary sense lines, can be used to select one of plural logical operations to implement involving the starting data values stored in the sense amplifier 706 and compute component 731. The four control signals, in conjunction with a particular data value present on the complementary sense lines, controls the continuity of the pass gates 707-1 and 707-2 and swap transistors 742, which in turn affects the data value in the compute component 731 and/or sense amplifier 706 before/after firing. The capability to selectably control continuity of the swap transistors 742 facilitates implementing logical operations involving inverse data values (e.g., inverse operands and/or inverse result), among others.

Figure 8:
FIG. 8 is a logic table illustrating selectable logic operation results implemented by a sensing circuitry in accordance with a number of embodiments of the present disclosure.

The logic table illustrated in FIG. 8 shows the starting data value stored in the compute component 731 shown in column A at 844, and the starting data value stored in the sense amplifier 706 shown in column B at 845. The other 3 top column headings (NOT OPEN, OPEN TRUE, and OPEN INVERT) in the logic table of FIG. 8 refer to the continuity of the pass gates 707-1 and 707-2, and the swap transistors 742, which can respectively be controlled to be OPEN or CLOSED depending on the state of the four logic selection control signals (e.g., TF, TT, FT, and FF), in conjunction with a particular data value present on the pair of complementary sense lines 705-1 and 705-2 when the ISO control signal is asserted. The "Not Open" column corresponds to the pass gates 707-1 and 707-2 and the swap transistors 742 both being in a non-conducting condition, the "Open True" corresponds to the pass gates 707-1 and 707-2 being in a conducting condition, and the "Open Invert" corresponds to the swap transistors 742 being in a conducting condition. The configuration corresponding to the pass gates 707-1 and 707-2 and the swap transistors 742 both being in a conducting condition is not reflected in the logic table of FIG. 8 since this results in the sense lines being shorted together.

Via selective control of the continuity of the pass gates 707-1 and 707-2 and the swap transistors 742, each of the three columns of the first set of two rows of the upper portion of the logic table of FIG. 8 can be combined with each of the three columns of the second set of two rows below the first set to provide 3×3=9 different result combinations, corresponding to nine different logical operations, as indicated by the various connecting paths shown at 875. The nine different selectable logical operations that can be implemented by the sensing circuitry 750 are summarized in the logic table illustrated in FIG. 13.

The columns of the lower portion of the logic table illustrated in FIG. 8 show a heading 880 that includes the state of logic selection control signals. For example, the state of a first logic selection control signal is provided in row 876, the state of a second logic selection control signal is provided in row 877, the state of a third logic selection control signal is provided in row 878, and the state of a fourth logic selection control signal is provided in row 879. The particular logical operation corresponding to the results is summarized in row 847.

As such, the sensing circuitry shown in FIG. 7 can be used to perform various logical operations as shown in FIG. 8. For example, the sensing circuitry 750 can be operated to perform various logical operations (e.g., AND and OR logical operations) in association with comparing data patterns in memory in accordance with a number of embodiments of the present disclosure.

The present disclosure includes apparatuses and methods related to virtual address tables. An example method comprises generating an object file that comprises: an instruction comprising a number of arguments; and an address table comprising a number of indexed address elements. Each one of the number of indexed address elements can correspond to a virtual address of a respective one of the number of arguments, wherein the address table can serves as a target for the number of arguments. The method can include storing the object file in a memory.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
a host comprising a processor; and
a memory device coupled to the host, wherein the host is configured to:
generate an object file comprising:
multiple instructions each comprising a number of arguments; and
respective address tables corresponding to the multiple instructions and each comprising a number of indexed address elements each corresponding to a virtual address of a respective one of the number of arguments;
populate the address elements of the address tables with virtual addresses corresponding to the number of arguments; and
translate the virtual addresses corresponding to the number of arguments to physical locations in a memory array of the memory device prior to providing an instruction dispatch block to the memory device.

2. The system of claim 1, wherein the processor is configured to generate the object file via execution of a compiler.

3. The system of claim 1, further comprising a translation component.

4. The system of claim 3, further comprising a channel controller, and wherein the translation component is a component of the channel controller.

5. The system of claim 4, wherein the channel controller is located on a same die as the processor.

6. The system of claim 3, wherein the translation component includes a memory management unit.

7. The system of claim 1, wherein at least one of the multiple instructions comprises a performed in memory device (PIMD) instruction comprising an intrinsic function recognized by a compiler executable by the processor.

8. The system of claim 1, wherein the processor is configured to initiate an application corresponding to the object file.

9. The system of claim 1, wherein the multiple instructions comprise performed in memory device (PIMD) instructions whose arguments target the address tables, and wherein the object file also comprises a number of non-PIMD instructions whose arguments target registers of the processor.

10. A system, comprising:
a host; and
a memory device coupled to the host, wherein the host is configured to:
execute a compiler to generate an object file comprising:
multiple instructions each comprising a number of arguments; and
respective address tables corresponding to the multiple instructions and each comprising a number of indexed address elements each corresponding to a virtual address of a respective one of the number of arguments;
populate, at runtime, the address elements of the address tables with virtual addresses corresponding to the number of arguments such that a populated address table exists on the host; and
prior to providing an instruction dispatch block to the memory device, translate the virtual addresses corresponding to the number of arguments to physical locations in a memory array of the memory device.

11. The system of claim 10, wherein the host is coupled to the memory device via a bus, and wherein the host comprises a processor and a channel controller.

12. The system of claim 10, wherein the host is coupled to the memory device via a bus, and wherein the host comprises a translation component and a memory management unit.

13. The system of claim 12, wherein the memory management unit is a component of the translation component.

14. The system of claim 12, wherein the translation component is a component of the channel controller.

15. The system of claim 10, wherein the channel controller is external to the host.

16. A system, comprising:
a memory device configured to execute performed in memory device (PIMD) instructions; and
a host coupled to the memory device and comprising:
a processor;
a channel controller;
a translation component; and
a memory management component; and
wherein the host is configured to:
compile an object file, the object file comprising:
multiple instructions each comprising a number of arguments; and
respective address tables corresponding to the multiple instructions and each comprising a number of indexed address elements each corresponding to a virtual address of a respective one of the number of arguments; and
execute the object file by:
populating, at runtime, the address elements of the address tables with virtual addresses corresponding to the number of arguments; and
translating the virtual addresses corresponding to the number of arguments to physical locations in a memory array of the memory device prior to providing an instruction dispatch block to the memory device for execution.

17. The system of claim 16, wherein the memory device is also configured to execute non-PIMD instructions whose arguments target registers of the processor.

18. The system of claim 16, wherein the translation component is a component of the channel controller.

19. The system of claim 18, wherein the memory management component is a component of the translation component.

20. The system of claim 16, wherein the processor and channel controller are on a same die which is separated from a die on which the memory device resides.

* * * * *